(12) United States Patent
Ryu et al.

(10) Patent No.: US 12,013,465 B2
(45) Date of Patent: Jun. 18, 2024

(54) METHOD AND APPARATUS FOR TRACKING OBJECT USING LiDAR SENSOR AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Soo Kyung Ryu, Seoul (KR); Yoon Ho Jang, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 299 days.

(21) Appl. No.: 17/572,358

(22) Filed: Jan. 10, 2022

(65) Prior Publication Data
US 2022/0291390 A1 Sep. 15, 2022

(30) Foreign Application Priority Data
Mar. 15, 2021 (KR) .................. 10-2021-0033359

(51) Int. Cl.
| | |
|---|---|
| *G01S 17/931* | (2020.01) |
| *B60W 40/06* | (2012.01) |
| *G01S 17/42* | (2006.01) |
| *G01S 17/86* | (2020.01) |
| *G01S 19/14* | (2010.01) |

(52) U.S. Cl.
CPC ........... *G01S 17/931* (2020.01); *B60W 40/06* (2013.01); *G01S 17/42* (2013.01); *G01S 17/86* (2020.01); *G01S 19/14* (2013.01); *B60W 2420/408* (2024.01)

(58) Field of Classification Search
CPC ........ G01S 17/42; G01S 17/86; G01S 17/931; G01S 19/14; B60W 40/06; B60W 2420/52
USPC ............................................................ 701/3
See application file for complete search history.

(56) References Cited

U.S. PATENT DOCUMENTS

| | | | | |
|---|---|---|---|---|
| 10,620,317 | B1 * | 4/2020 | Chai | ........................ G06T 7/70 |
| 2015/0336546 | A1 * | 11/2015 | Al-Zahrani | ............. G01S 17/04 701/93 |
| 2019/0130182 | A1 * | 5/2019 | Zang | .................... G06V 20/182 |

(Continued)

FOREIGN PATENT DOCUMENTS

| | | | | | |
|---|---|---|---|---|---|
| AU | 2021204561 A1 | * | 2/2023 | ............. | G01S 17/93 |
| CN | 114616489 A | * | 6/2022 | ............. | G01B 11/22 |

(Continued)

*Primary Examiner* — Atul Trivedi
(74) *Attorney, Agent, or Firm* — MORGAN, LEWIS & BOCKIUS LLP

(57) ABSTRACT

An object-tracking method using a LiDAR sensor may include forming a first inclination using GPS altitude points of a vehicle driving region, detecting a driving lane using LiDAR points of a vehicle and determining a second inclination using the detected driving lane, rotating the GPS altitude points using the first inclination and the second inclination, obtaining a third inclination using a target point and a neighboring point, among the LiDAR points, the neighboring point belonging to a previous layer adjacent to a current layer to which the target point belongs, obtaining a fourth inclination using points that match the LiDAR points, among the rotated GPS altitude points, and determining the target point to be a ground point when the absolute value of the difference between the third inclination and the fourth inclination is less than a threshold inclination.

18 Claims, 18 Drawing Sheets

(56) References Cited

U.S. PATENT DOCUMENTS

| | | | |
|---|---|---|---|
| 2019/0258878 A1* | 8/2019 | Koivisto | G06N 3/084 |
| 2020/0081134 A1* | 3/2020 | Wheeler | G01S 19/14 |
| 2020/0286310 A1* | 9/2020 | Carver | G07C 5/02 |
| 2020/0293045 A1* | 9/2020 | Ghiglino Novoa | G05D 1/0094 |
| 2020/0378781 A1* | 12/2020 | Kantarjiev | G01C 21/3691 |
| 2021/0041869 A1* | 2/2021 | Meyer | G08G 1/0967 |
| 2021/0048817 A1* | 2/2021 | Olson | B60W 40/114 |
| 2021/0150230 A1* | 5/2021 | Smolyanskiy | G06V 20/56 |
| 2021/0183093 A1* | 6/2021 | Park | G06V 20/588 |
| 2021/0197813 A1* | 7/2021 | Houston | B60W 30/143 |
| 2021/0372796 A1* | 12/2021 | Lin | G01C 21/20 |
| 2022/0111868 A1* | 4/2022 | Costea | G06V 20/56 |
| 2022/0415059 A1* | 12/2022 | Smolyanskiy | B60W 60/0027 |
| 2023/0121226 A1* | 4/2023 | Schroeter | G06V 20/56 |
| | | | 702/152 |
| 2023/0128756 A1* | 4/2023 | Desai | G01S 17/42 |
| | | | 382/106 |
| 2023/0136860 A1* | 5/2023 | Wang | G06V 20/58 |
| | | | 345/419 |
| 2023/0139772 A1* | 5/2023 | Wang | G06V 10/454 |
| | | | 345/419 |
| 2023/0406325 A1* | 12/2023 | Beaurepaire | B60W 40/04 |

FOREIGN PATENT DOCUMENTS

| | | | | |
|---|---|---|---|---|
| KR | 10-2019-0049009 | | 5/2019 | |
| KR | 10-2019-0064798 | | 6/2019 | |
| WO | WO-2019208080 A1 * | | 10/2019 | B60K 35/00 |

\* cited by examiner

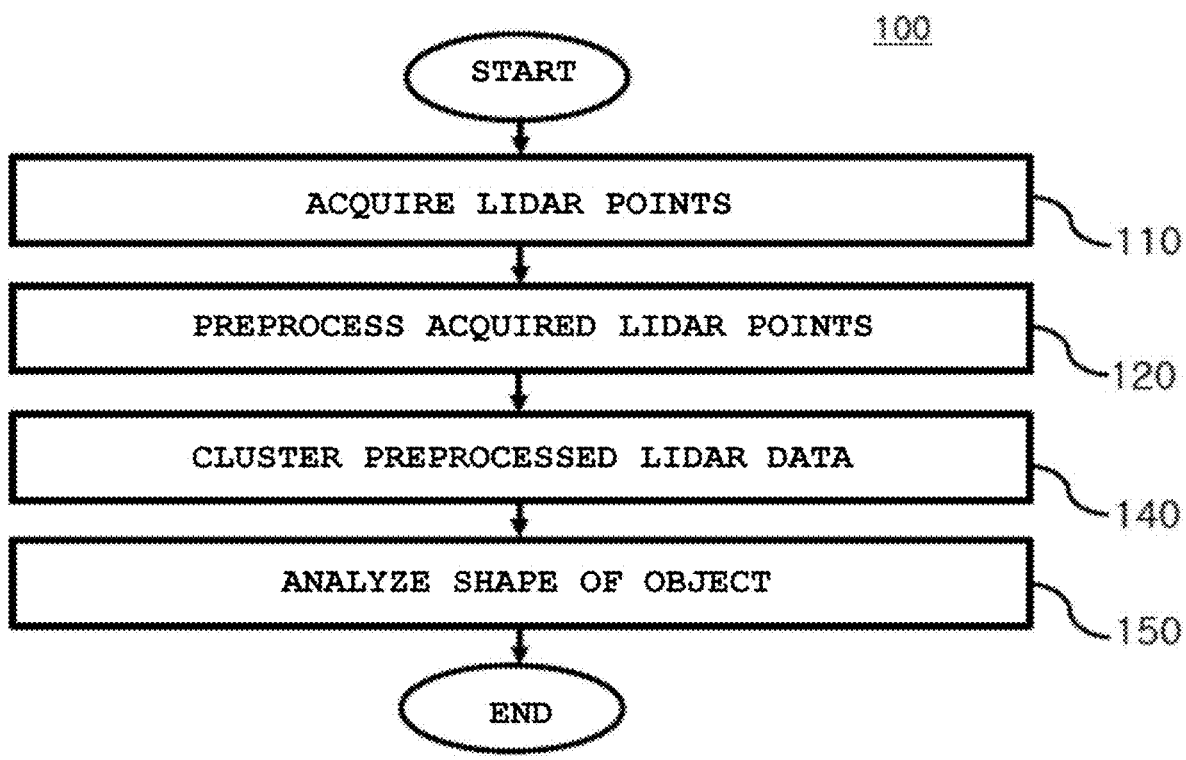
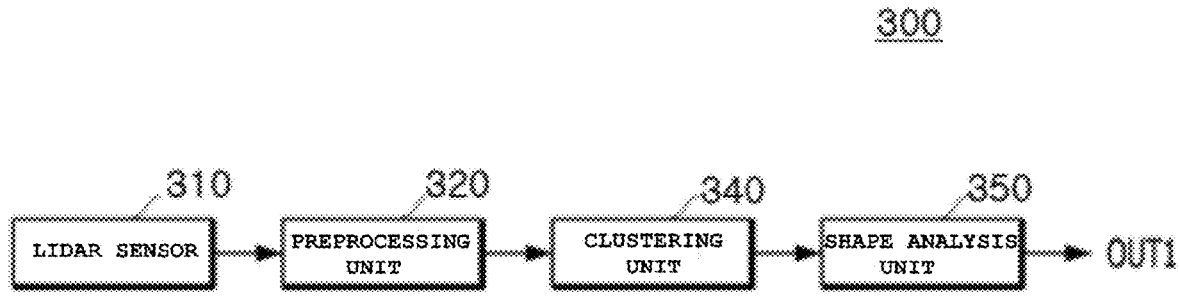

<br>

METHOD AND APPARATUS FOR TRACKING OBJECT USING LiDAR SENSOR AND RECORDING MEDIUM STORING PROGRAM TO EXECUTE THE METHOD

CROSS-REFERENCE TO RELATED APPLICATION

The present application claims priority to Korean Patent Application No. 10-2021-0033359, filed on Mar. 15, 2021, the entire contents of which is incorporated herein for all purposes by this reference.

BACKGROUND OF THE INVENTION

Field of the Invention

The present invention relates to a method and apparatus of tracking an object using a Light Detection and Ranging (LiDAR) sensor and to a recording medium storing a program to execute the method.

Description of Related Art

Before generating a track using a plurality of LiDAR points, acquired using a LiDAR sensor, it is required to determine, in a preprocessing process, whether the LiDAR points are points corresponding to a road surface or points corresponding to an object. In particular, because LiDAR points are highly influenced by the external environment, various studies have recently been conducted to enable a determination as to whether LiDAR points correspond to a road surface or correspond to an object without being affected by the external environment.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus of tracking an object using a Light Detection and Ranging (LiDAR) sensor and to a recording medium storing a program to execute the method that substantially obviate one or more problems due to limitations and disadvantages of the related art.

Embodiments provide a method and apparatus for tracking an object using a LiDAR sensor and a recording medium storing a program to execute the method that enable accurate and rapid tracking of an object.

However, the objects to be accomplished by the exemplary embodiments are not limited to the above-mentioned objects, and other objects not mentioned herein will be clearly understood by those skilled in the art from the following description.

An object-tracking method using a LiDAR sensor according to various exemplary embodiments of the present invention may include forming a first inclination using Global Positioning System (GPS) altitude points of a vehicle driving region, detecting a driving lane using LiDAR points of a vehicle and determining a second inclination using the detected driving lane, rotating the GPS altitude points using the first inclination and the second inclination, obtaining a third inclination using a target point and a neighboring point, among the LiDAR points, the neighboring point belonging to a previous layer adjacent to a current layer to which the target point belongs, obtaining a fourth inclination using points that match the LiDAR points, among the rotated GPS altitude points, and determining the target point to be a ground point when the absolute value of the difference between the third inclination and the fourth inclination is less than a threshold inclination.

For example, the object-tracking method may further include acquiring the GPS altitude points of the vehicle driving region and generating interpolated altitude points indicating the altitudes of regions located between the GPS altitude points within the vehicle driving region, and the first inclination may be formed using at least some of the GPS altitude points or the interpolated altitude points.

For example, the forming the first inclination may further include selecting a first inspection target region located within a first distance centered on the vehicle within the vehicle driving region, and the first inclination may be formed using at least some of the GPS altitude points or the interpolated altitude points present within the first inspection target region.

For example, the detecting the driving lane may include selecting LiDAR points present within a predetermined distance centered on the vehicle from among the LiDAR points, selecting LiDAR points having relatively high intensity from the selected LiDAR points present within the predetermined distance, and selecting LiDAR points having a linear property as LiDAR points corresponding to the driving lane from among the LiDAR points having relatively high intensity.

For example, the determining the second inclination may further include selecting a second inspection target region located within a second distance centered on the vehicle within the vehicle driving region, and the second inclination may be determined using LiDAR points present within the second inspection target region, among the selected LiDAR points corresponding to the driving lane.

For example, the first distance and the second distance may be identical to each other.

For example, the rotated GPS altitude points may form an inclination equivalent to the sum of the first inclination and the second inclination.

For example, the threshold inclination may be 0.5°.

For example, the object-tracking method may further include preprocessing the LiDAR points, clustering the preprocessed LiDAR points into meaningful units according to predetermined criteria, and analyzing the shape of an object using the clustered LiDAR points, and the obtaining the first to fourth inclinations, the rotating the GPS altitude points, and the determining whether the target point is the ground point may be performed in the preprocessing the LiDAR points.

An object-tracking apparatus using a LiDAR sensor according to another exemplary embodiment of the present invention may include a first inclination acquisition unit configured to form a first inclination using GPS altitude points of a vehicle driving region, a second inclination acquisition unit configured to detect a driving lane using LiDAR points of a vehicle and to determine a second inclination using the driving lane, an altitude point rotation unit configured to rotate the GPS altitude points using the first inclination and the second inclination, a third inclination acquisition unit configured to determine a third inclination using a target point and a neighboring point, among the LiDAR points, the neighboring point belonging to a previous layer adjacent to a current layer to which the target point belongs, a fourth inclination acquisition unit configured to determine a fourth inclination using points that match the LiDAR points, among the rotated GPS altitude points, a comparison unit configured to compare the absolute value of the difference between the third inclination and the fourth inclination with a threshold inclination, and a point attribute determination unit configured to determine whether the target point is a ground point or an object point in response to the result of the comparison by the comparison unit.

For example, the object-tracking apparatus may further include a GPS altitude acquisition unit configured to acquire the GPS altitude points of the vehicle driving region.

For example, the object-tracking apparatus may further include an altitude point interpolation unit configured to generate interpolated altitude points indicating the altitudes of regions located between the GPS altitude points within the vehicle driving region, and the first inclination acquisition unit may form the first inclination using at least some of the GPS altitude points or the interpolated altitude points.

For example, the second inclination acquisition unit may include a point selection unit, configured to select LiDAR points corresponding to the driving lane from among the LiDAR points, and an inclination calculation unit, configured to determine the second inclination using the LiDAR points selected by the point selection unit.

For example, the point selection unit may include a distance inspection unit configured to select LiDAR points present within a predetermined distance centered on the vehicle from among the LiDAR points, an intensity inspection unit configured to select LiDAR points having relatively high intensity from the selected LiDAR points present within the predetermined distance, and a linearity inspection unit configured to select LiDAR points having a linear property as LiDAR points corresponding to the driving lane from among the LiDAR points having relatively high intensity.

For example, the altitude point rotation unit may include an inclination synthesis unit configured to sum the first inclination and the second inclination and to output the rotated GPS altitude points formed by the summed inclination.

For example, the threshold inclination may be 0.5°.

For example, the object-tracking apparatus may further include a LiDAR sensor configured to acquire the LiDAR points related to the vehicle driving region, a preprocessing unit configured to preprocess the LiDAR points, the preprocessing unit including the first inclination acquisition unit, the second inclination acquisition unit, the third inclination acquisition unit, the fourth inclination acquisition unit, the altitude point rotation unit, the comparison unit, and the point attribute determination unit, a clustering unit configured to cluster the preprocessed LiDAR points into meaningful units according to predetermined criteria, and a shape analysis unit configured to analyze the shape of an object using the clustered LiDAR points.

According to various exemplary embodiments of the present invention, a computer-readable recording medium in which a program for executing a method of tracking an object using a LiDAR sensor is recorded may store a program to implement a function of forming a first inclination using GPS altitude points of a vehicle driving region, a function of detecting a driving lane using LiDAR points of a vehicle and determining a second inclination using the detected driving lane, a function of rotating the GPS altitude points using the first inclination and the second inclination, a function of obtaining a third inclination using a target point and a neighboring point, among the LiDAR points, the neighboring point belonging to a previous layer adjacent to a current layer to which the target point belongs, a function of obtaining a fourth inclination using points that match the LiDAR points, among the rotated GPS altitude points, and a function of determining the target point to be a ground point when the absolute value of the difference between the third inclination and the fourth inclination is less than a threshold inclination.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1 is a flowchart showing an object-tracking method using a LiDAR sensor according to an exemplary embodiment of the present invention.

FIG. 2 is a block diagram of an object-tracking apparatus using a LiDAR sensor according to an exemplary embodiment of the present invention.

Figure 3:
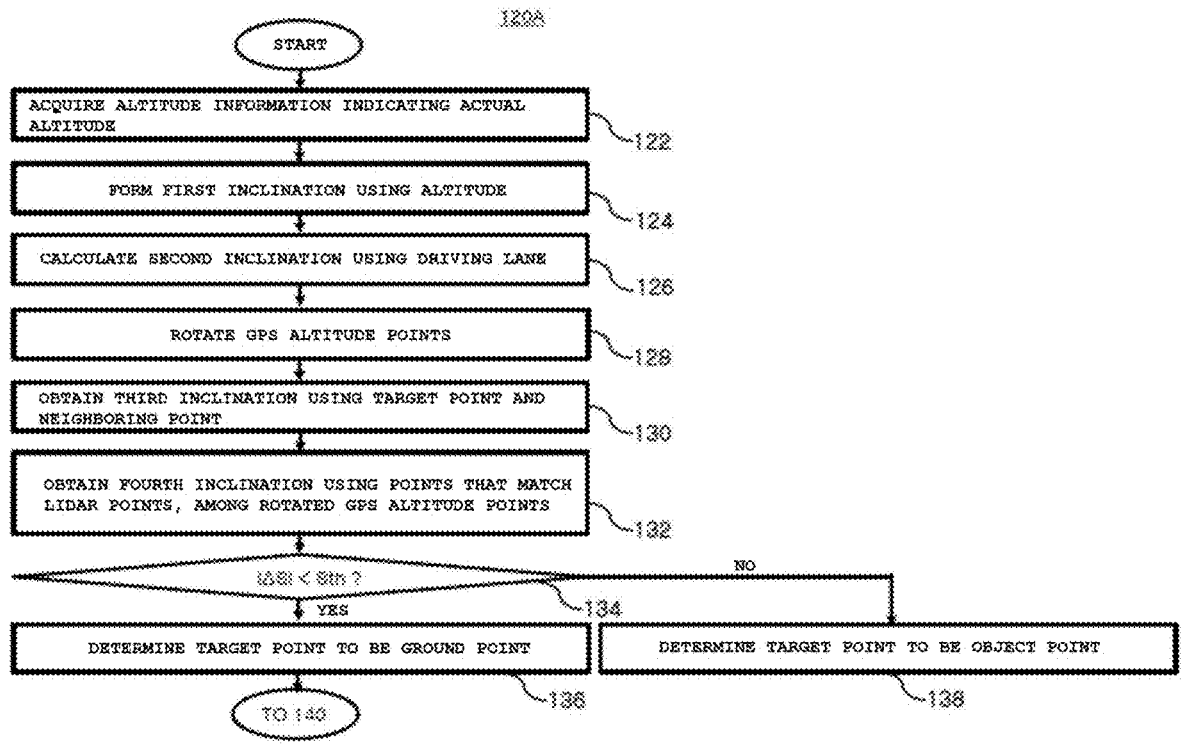
FIG. 3 is a flowchart showing the object-tracking method according to the embodiment.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The present invention will now be described more fully hereinafter with reference to the accompanying drawings, in which various embodiments are shown. The examples, however, may be embodied in many different forms, and may not be construed as being limited to the embodiments set forth herein. Rather, these embodiments are provided so that the present disclosure will be more thorough and complete, and will more fully convey the scope of the present invention to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

Furthermore, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a method and apparatus of tracking an object using a light detection and ranging (LiDAR) sensor and a recording medium storing a program to execute the method according to exemplary embodiments will be described with reference to the accompanying drawings. The method and apparatus of tracking an object using the LiDAR sensor and the recording medium storing a program to execute the method will be described using the Cartesian coordinate system (x-axis, y-axis, z-axis) for convenience of description, but may also be described using other coordinate systems. In the Cartesian coordinate system, the x-axis, the y-axis, and the z-axis are perpendicular to each other, but the exemplary embodiments are not limited thereto. That is, the x-axis, the y-axis, and the z-axis may intersect each other obliquely.

FIG. 1 is a flowchart showing an object-tracking method 100 using a LiDAR sensor according to various exemplary embodiments of the present invention, and FIG. 2 is a block diagram of an object-tracking apparatus 300 using the LiDAR sensor according to an exemplary embodiment of the present invention.

The object-tracking apparatus 300 shown in FIG. 2 may include a LiDAR sensor 310, a preprocessing unit 320, a clustering unit 340, and a shape analysis unit (or a segment unit) 350.

The LiDAR sensor 310 may acquire a point cloud including a plurality of points related to a region in which a vehicle provided with the LiDAR sensor 310 (hereinafter referred to as a "host vehicle") travels (or a region encompassing a traveling region and a surrounding region) (hereinafter referred to as a "vehicle driving region"), and may output the acquired point cloud to the preprocessing unit 320 as LiDAR points (or LiDAR data) (step 110).

The LiDAR sensor 310 may radiate a single circular laser pulse having a wavelength of, for example, 905 nm to 1550 nm to a vehicle driving region, and may measure the time taken for the laser pulse to be reflected from an object or the ground (or the road surface) present within a measurement range, for detecting information on the object and the ground, for example, the distance from the LiDAR sensor 310 to the object or the ground, the orientation of the object or the ground, the speed of the object, the temperature of the object, the material distribution of the object, and the concentration characteristics of the object. Here, the object may be a target that is to be tracked by the object-tracking apparatus according to the exemplary embodiment of the present invention, for example, another vehicle, a person, or an obstacle present outside the host vehicle.

The LiDAR sensor 310 may include a transmitter, which transmits a laser pulse, and a receiver, which receives the laser reflected from the surface of an object and the ground present within a detection range. The receiver has a predetermined field of view (FOV), which is a range that the LiDAR sensor 310 is configured for observing simultaneously without moving or rotating.

Since the LiDAR sensor 310 has higher detection accuracy in vertical/horizontal directions than a radio detecting and ranging (RaDAR) sensor, the LiDAR sensor 310 is configured for providing accurate vertical/horizontal-directional position information, and is thus advantageously used for obstacle detection and vehicle position recognition. As examples of the LiDAR sensor 310, there are a two-dimensional (2D) LiDAR sensor and a three-dimensional (3D) LiDAR sensor. The 2D LiDAR sensor is configured to be tiltable or rotatable, and is used to obtain LiDAR data including 3D information through tilting or rotation. The 3D LiDAR sensor is configured for obtaining a plurality of 3D points and thus of predicting the height information of an obstacle, thus helping in accurate and precise detection and tracking of an object. The 3D LiDAR sensor may include multiple 2D LiDAR sensor layers, and may generate LiDAR data including 3D information. The LiDAR sensor 310 according to the exemplary embodiment may correspond to a 3D LiDAR sensor.

The method and apparatus of tracking an object according to the exemplary embodiments are not limited to any specific shape, position, or type of LiDAR sensor 310.

After step 110, the preprocessing unit 320 may preprocess the LiDAR points output from the LiDAR sensor 310 (step 120). To the present end, the preprocessing unit 320 may perform calibration to match the coordinates between the LiDAR sensor 310 and the host vehicle. That is, the preprocessing unit 320 may convert the LiDAR points into points suitable for the reference coordinate system according to the positional angle at which the LiDAR sensor 310 is mounted to the host vehicle.

Furthermore, the preprocessing unit 320 may perform filtering to remove points having low intensity or reflectance using intensity or confidence information of the LiDAR points.

Furthermore, the preprocessing unit 320 may remove data pertaining to reflections from the host vehicle. That is, since there is a region that is shielded by the body of the host vehicle according to the mounting position and the field of view of the LiDAR sensor 310, the preprocessing unit 320 may remove data pertaining to reflections from the body of the host vehicle using the reference coordinate system.

After step 120, the clustering unit 340 may cluster the LiDAR points preprocessed by the preprocessing unit 320 into meaningful units according to predetermined criteria, and may output the clustered LiDAR points to the shape analysis unit 350 (step 140). As examples of the clustering unit 340, there are a 2D clustering unit and a 3D clustering unit. The 2D clustering unit is a unit that performs clustering in units of points or a specific structure by projecting data onto the x-y plane without considering height information. The 3D clustering unit is a unit that performs clustering in the x-y-z plane in consideration of height information z.

After step 140, the shape analysis unit 350 may analyze the shape of an object using the LiDAR points obtained by clustering the point cloud, and may output the result of the analysis to an object-tracking unit (a tracking unit, a tracking and classification unit, or an object detection unit) through an output terminal OUT1 (step 150). For example, the shape analysis unit 350 generates information on a plurality of segment boxes for each channel using the result of clustering by the clustering unit 340. Here, the segment box may be the result of converting the result of clustering into a geometric box shape. Furthermore, the information on the segment box may be at least one of the width, length, position, or orientation (or heading) of the segment box.

The object-tracking unit selects a segment box in association with an object which is being tracked (hereinafter referred to as a "target object") at the current time, among a plurality of segment boxes for each channel. Here, the term "association" is a process of selecting the box which is to be used to continue tracking an object which is currently being tracked, among a plurality of pieces of information on the segment boxes acquired for the same object according to the visibility of the LiDAR sensor 310 and the shape of the object. This association may be performed at a predetermined period.

To select an associated segment box from among the plurality of segment boxes provided by each channel from the shape analysis unit 350, the object-tracking unit may convert information on each of the plurality of segment boxes into a predetermined format, and may select an associated segment box from among the plurality of segment boxes having the converted format (or segment boxes of a meta object).

The object-tracking method according to the exemplary embodiment of the present invention, which will be described below, is not limited as to the specific execution method of each of the clustering process in step 140 and the shape analysis process in step 150.

An object and the ground (or the road surface) may be present within the vehicle driving region, and it may be required to determine whether the LiDAR points are points related to the object (hereinafter referred to as "object points") or points related to the ground (hereinafter referred to as "ground points"). This may be performed by the preprocessing unit 320 shown in FIG. 2, but the exemplary embodiments are not limited thereto. This will be described in detail below with reference to the accompanying drawings.

FIG. 3 is a flowchart showing an object-tracking method 120A according to an exemplary embodiment of the present invention.

The object-tracking method 120A shown in FIG. 3 may be performed in step 120 shown in FIG. 1, but the exemplary embodiments are not limited thereto.

First, information indicating the actual altitude (or height) of the vehicle driving region (hereinafter referred to as "altitude information") is acquired (step 122). Although step 122 is illustrated as being performed after step 110 shown in FIG. 1 is performed, the exemplary embodiments are not limited thereto. That is, according to another exemplary embodiment of the present invention, step 122 may be performed before step 110 is performed, or may be performed simultaneously with step 110.

Figure 4:
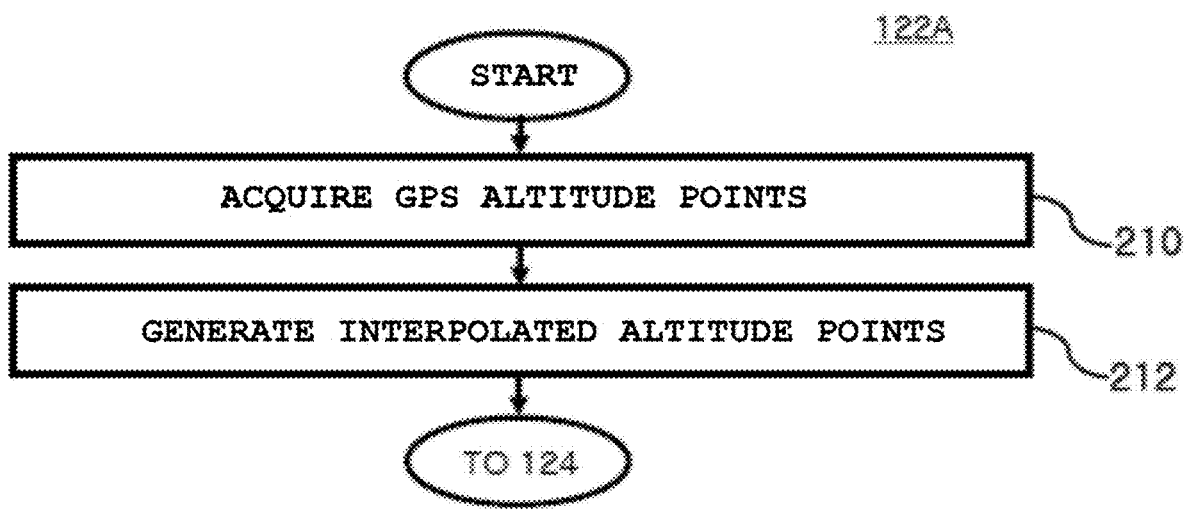
FIG. 4 is a flowchart showing an exemplary embodiment of step 122 shown in FIG. 3.

FIG. 4 is a flowchart showing an exemplary embodiment 122A of step 122 shown in FIG. 3.

Figure 5:
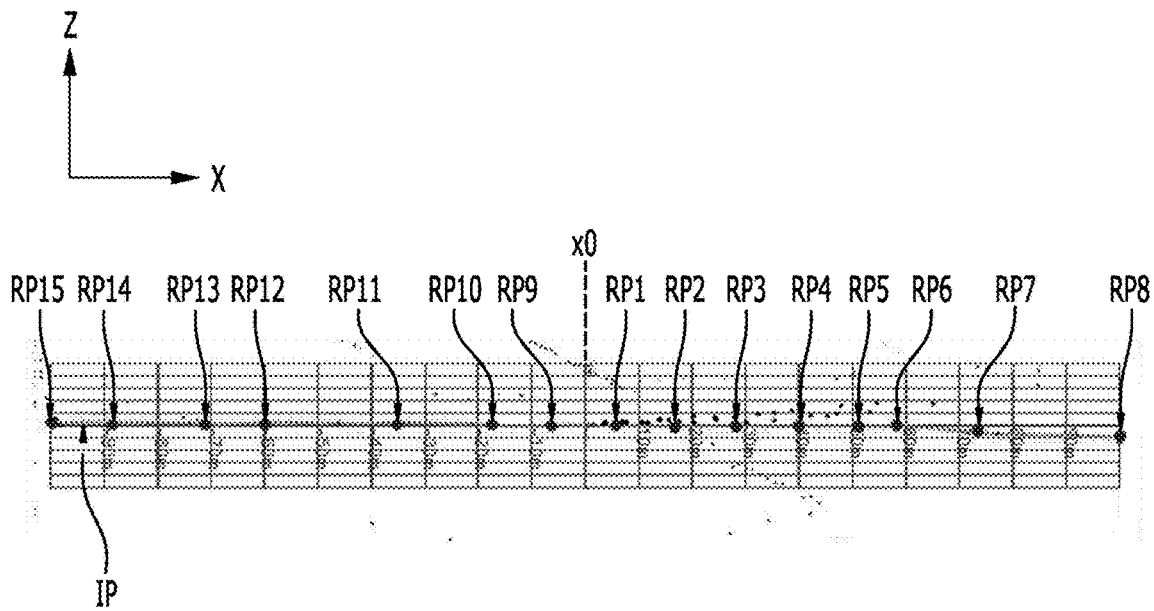
FIG. 5 is a diagram for helping understanding step 122A shown in FIG. 4.

FIG. 5 is a diagram for helping understanding step 122A shown in FIG. 4.

According to the exemplary embodiment 122A of step 122 of acquiring the altitude information, global positioning system (GPS) altitude points of the vehicle driving region may be acquired (step 210). Here, the GPS altitude points may correspond to a plurality of actual altitude points that indicate the actual altitude of the vehicle driving region. For example, the GPS altitude points may be acquired using GPS signals transmitted from a map maker to the host vehicle.

The GPS altitude points are points that indicate the actual altitude of an object or the ground present within the vehicle driving region based on the ground on which the host vehicle is located.

For example, referring to FIG. 5, GPS altitude points RP1 to RP8 that fall within a predetermined range (e.g., a range of 100 m) in the +x-axis direction based on the position x0 of the host vehicle within the vehicle driving region may be acquired, and GPS altitude points RP9 to RP15 that fall within a predetermined range (e.g., a range of 100 m) in the −x-axis direction based on the position x0 of the host vehicle within the vehicle driving region may be acquired.

After step 210, points indicating the altitudes of the regions located between the GPS altitude points within the vehicle driving region are generated (step 212). That is, since there are no GPS altitude points for the regions present between the GPS altitude points, points indicating the altitudes of the regions present between the GPS altitude points (hereinafter referred to as "interpolated altitude points") may be generated using interpolation. For example, the interpolated altitude points for the regions present between the GPS altitude points RP1 to RP15 may be obtained by performing interpolation in units of 1 m. It may be seen from FIG. 5 that a plurality of interpolated altitude points (e.g., IP) is generated using interpolation between adjacent GPS altitude points (e.g., RP14 and RP15).

As described above, the altitude information acquired in step 122 may include at least some of the GPS altitude points (e.g., RP1 to RP15) or the interpolated altitude points (e.g., points IP that are smaller than the actual altitude points shown in FIG. 5). That is, the altitude information acquired in step 122 may include both the GPS altitude points and the interpolated altitude points, may include only the GPS altitude points, or may include only the interpolated altitude points.

Hereinafter, the altitude information acquired in step 122 will be referred to as necessarily including the GPS altitude points, but the exemplary embodiments are not limited thereto.

Referring back to FIG. 3, after step 122, a first inclination is formed based on the altitude information of the vehicle driving region (step 124). Here, the first inclination may be an inclination with respect to the ground included in the vehicle driving region.

Figure 6:
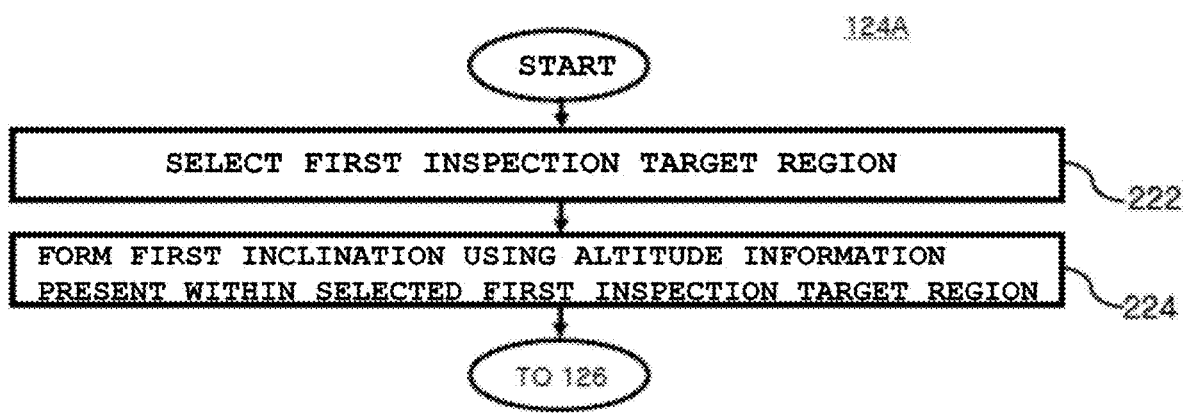
FIG. 6 is a flowchart for helping understanding an exemplary embodiment of step 124 shown in FIG. 3.

FIG. 6 is a flowchart for helping understanding an exemplary embodiment 124A of step 124 shown in FIG. 3.

Figure 7:
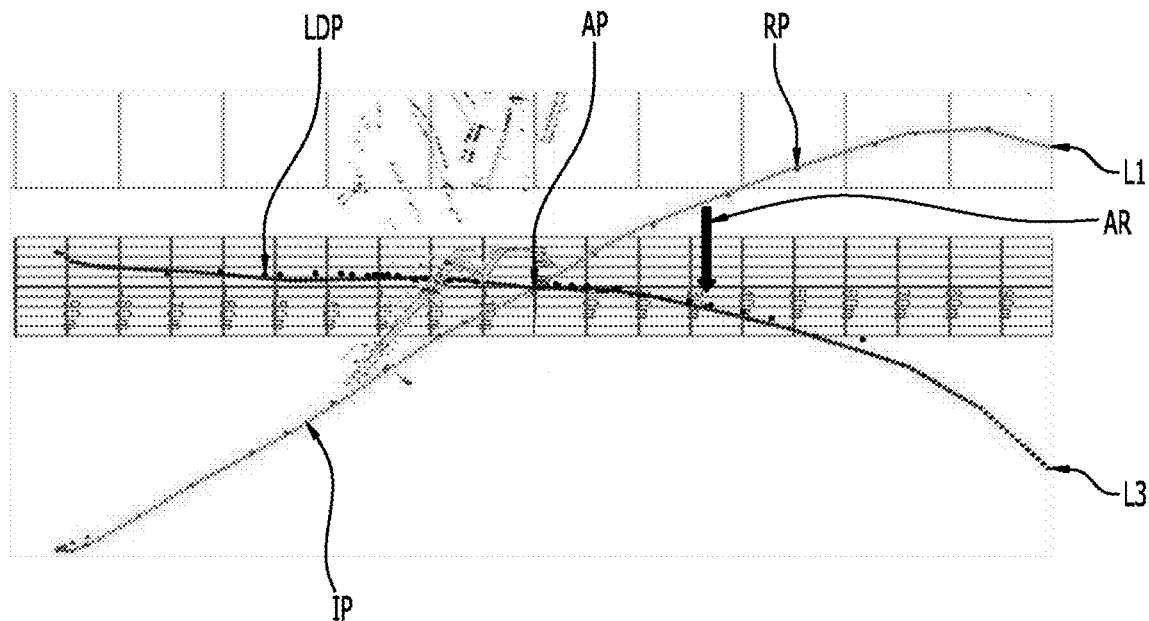
FIG. 7 is a graph for helping understanding steps 124 to 128 shown in FIG. 3.

FIG. 7 is a graph for helping understanding steps 124 to 128 shown in FIG. 3, which shows the position AP of the host vehicle, LiDAR points LDP expressed as white points, GPS altitude points RP expressed as large points located in a first line segment L1, and interpolated altitude points IP expressed as points smaller than the GPS altitude points RP in the first line segment L1.

Referring to FIG. 6, after step 122, a region located within a first distance centered on the host vehicle (hereinafter referred to as a "first inspection target region") is selected within the vehicle driving region (step 222). For example, referring to FIG. 7, a region located within a first distance (e.g., 10 m) centered on the position AP of the host vehicle (a region between −10 m and +10 m) may be selected as the first inspection target region within the vehicle driving region.

After step 222, a first inclination may be formed based on the altitude information (i.e., at least some of the GPS altitude points or the interpolated altitude points) present in the first inspection target region (step 224). For example, referring to FIG. 7, the first inclination S1 (or the first line segment L1 having the first inclination S1) may be formed using the GPS altitude point(s) RP and the interpolated altitude point(s) IP present in the first inspection target region.

Referring again to FIG. 3, after step 124, a second inclination of the vehicle driving region may be determined using LiDAR points related to a driving lane, among the LiDAR points acquired in step 110 (step 126). Here, the second inclination may be an inclination with respect to the ground included in the vehicle driving region.

Although step 126 is illustrated in FIG. 3 as being performed after step 124, the exemplary embodiments are not limited thereto. According to another exemplary embodiment of the present invention, step 126 may be performed after step 122 is performed and before step 124 is performed, or may be performed simultaneously with step 124.

Figure 8:
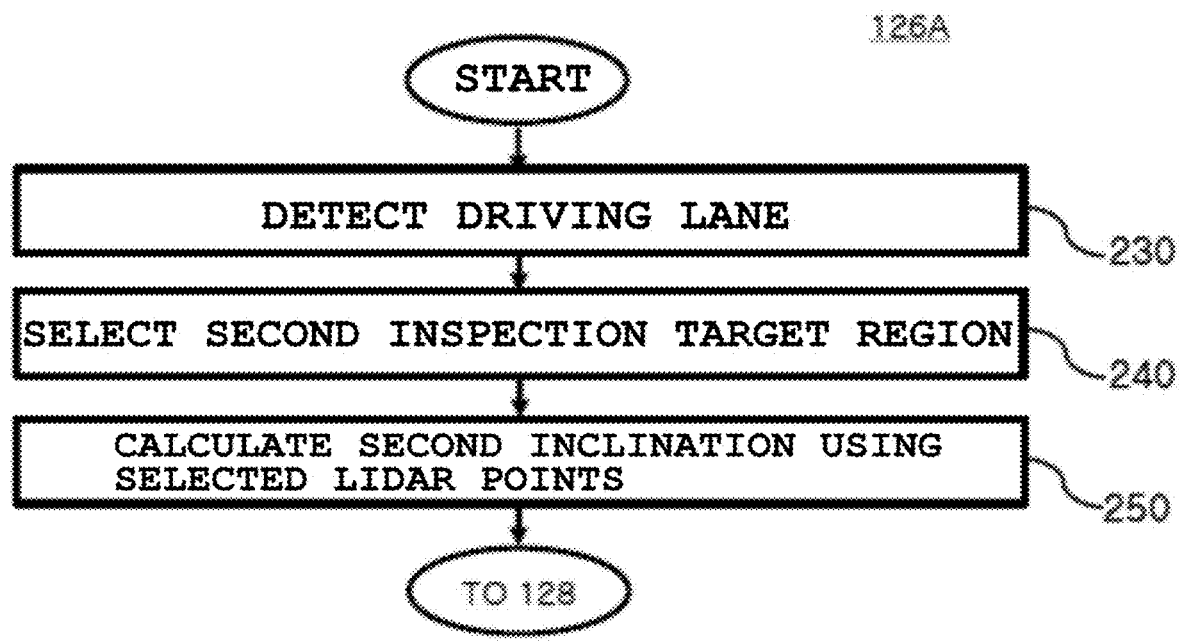
FIG. 8 is a flowchart for helping understanding an exemplary embodiment of step 126 shown in FIG. 3.

FIG. 8 is a flowchart for helping understanding an exemplary embodiment 126A of step 126 shown in FIG. 3.

Referring to FIG. 8, after step 124, LiDAR points corresponding to a driving lane, among the LiDAR points acquired in step 110, are detected (step 230).

Figure 9:
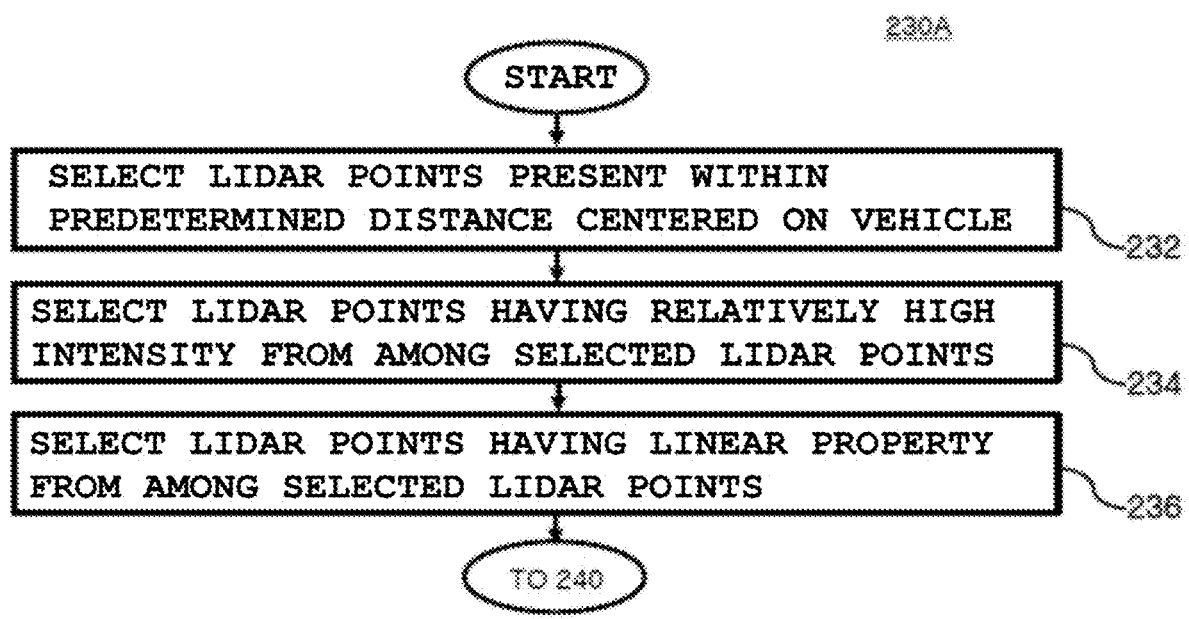
FIG. 9 is a flowchart showing an exemplary embodiment of step 230 shown in FIG. 8.

FIG. 9 is a flowchart showing an exemplary embodiment 230A of step 230 shown in FIG. 8.

Referring to FIG. 9, after step 124, LiDAR points present within a predetermined distance (e.g., 1.5 m) centered on the host vehicle are selected among the LiDAR points acquired in step 110 (step 232).

After step 232, LiDAR points having relatively high intensity are selected among the selected LiDAR points present within the predetermined distance (step 234). Here, the relatively high intensity may be, for example, an intensity that is greater than an average value or an intermediate value of the intensity of the LiDAR points present in the vehicle driving region, but the exemplary embodiments are not limited thereto.

After step 234, among the selected LiDAR points having relatively high intensity, LiDAR points having a linear property are selected as LiDAR points corresponding to the driving lane (step 236).

A method of detecting LiDAR points corresponding to a driving lane, among LiDAR points, may be performed in any of various ways, without being limited to what is illustrated in FIG. 9. Another example of a method of extracting points related to a driving lane is included in Korean Patent Laid-Open Publication No. 10-2019-0049009 (entitled "VEHICLE AND CONTROL METHOD THEREOF").

Referring again to FIG. 8, after step 230, a region located within a second distance centered on the host vehicle (hereinafter referred to as a "second inspection target region") is selected within the vehicle driving region (step 240). For example, a region located within a second distance (e.g., 10 m) centered on the position AP of the host vehicle (a region between −10 m and +10 m) may be selected as the second inspection target region within the vehicle driving region.

According to the exemplary embodiment of the present invention, the first distance and the second distance may be the same as or different from each other. The difference between the first distance and the second distance may be a predetermined value, and the predetermined value may be set in advance experimentally. However, the exemplary embodiments are not limited as to the specific predetermined value or the specific method of obtaining the predetermined value.

Figure 10:
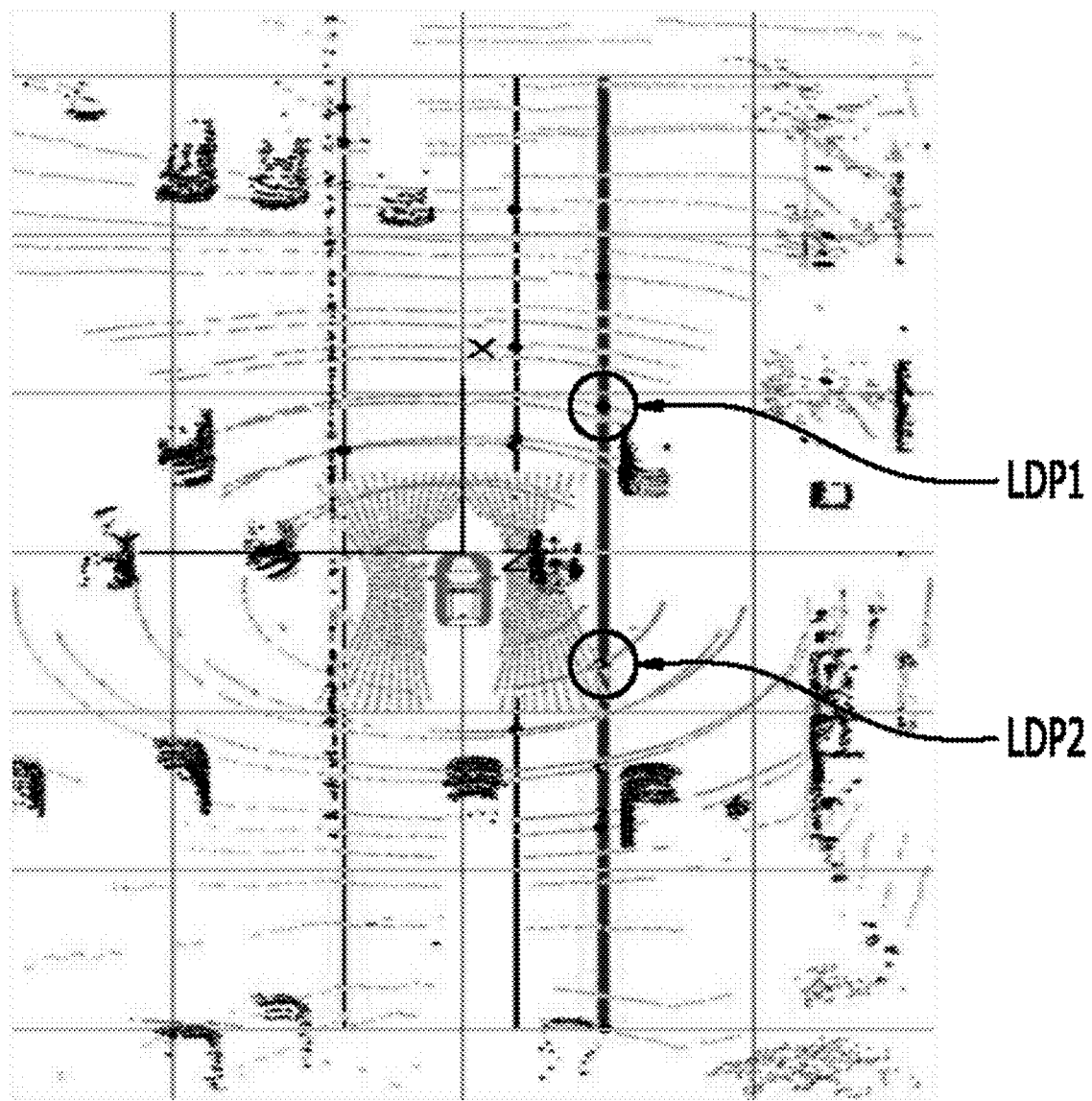
FIG. 10 is a diagram for helping understanding step 250 shown in FIG. 8.

FIG. 10 is a diagram for helping understanding step 250 shown in FIG. 8.

After step 240, the second inclination is determined using LiDAR points present in the second inspection target region selected in step 240, among the LiDAR points corresponding to the driving lane, which were detected in step 230 (step 250). For example, referring to FIG. 10, the second inclination may be determined using selected LiDAR points LDP1 and LDP2, which are present in the second inspection target region and correspond to the driving lane.

Referring again to FIG. 3, after step 126, the GPS altitude points are rotated using the first inclination S1 and the second inclination (step 128). For example, the first inclination S1 and the second inclination may be summed to perform step 128. That is, the GPS altitude points rotated in step 128 may form an inclination equivalent to the sum of the first inclination and the second inclination.

For better understanding, referring to FIG. 7, a third line segment L3, which has an inclination equivalent to the sum of the first inclination S1 of the first line segment L1 and the second inclination S2, may correspond to the rotated GPS altitude points. That is, the third line segment L3, which is the result of rotating the first line segment L1 in the direction of the arrow AR, may be obtained by performing step 128.

After step 128, a third inclination S3 is obtained using a target point and a neighboring point, among the LiDAR points present in the vehicle driving region (step 130). Here, the target point is a point which is to be inspected, among the LiDAR points acquired by the LiDAR sensor 310, to determine whether the point corresponds to a ground point or corresponds to an object point. Furthermore, the neighboring point is a point that belongs to a layer (hereinafter referred to as a "previous layer") adjacent to a certain layer to which the target point belongs (hereinafter referred to as a "current layer").

Figure 11:
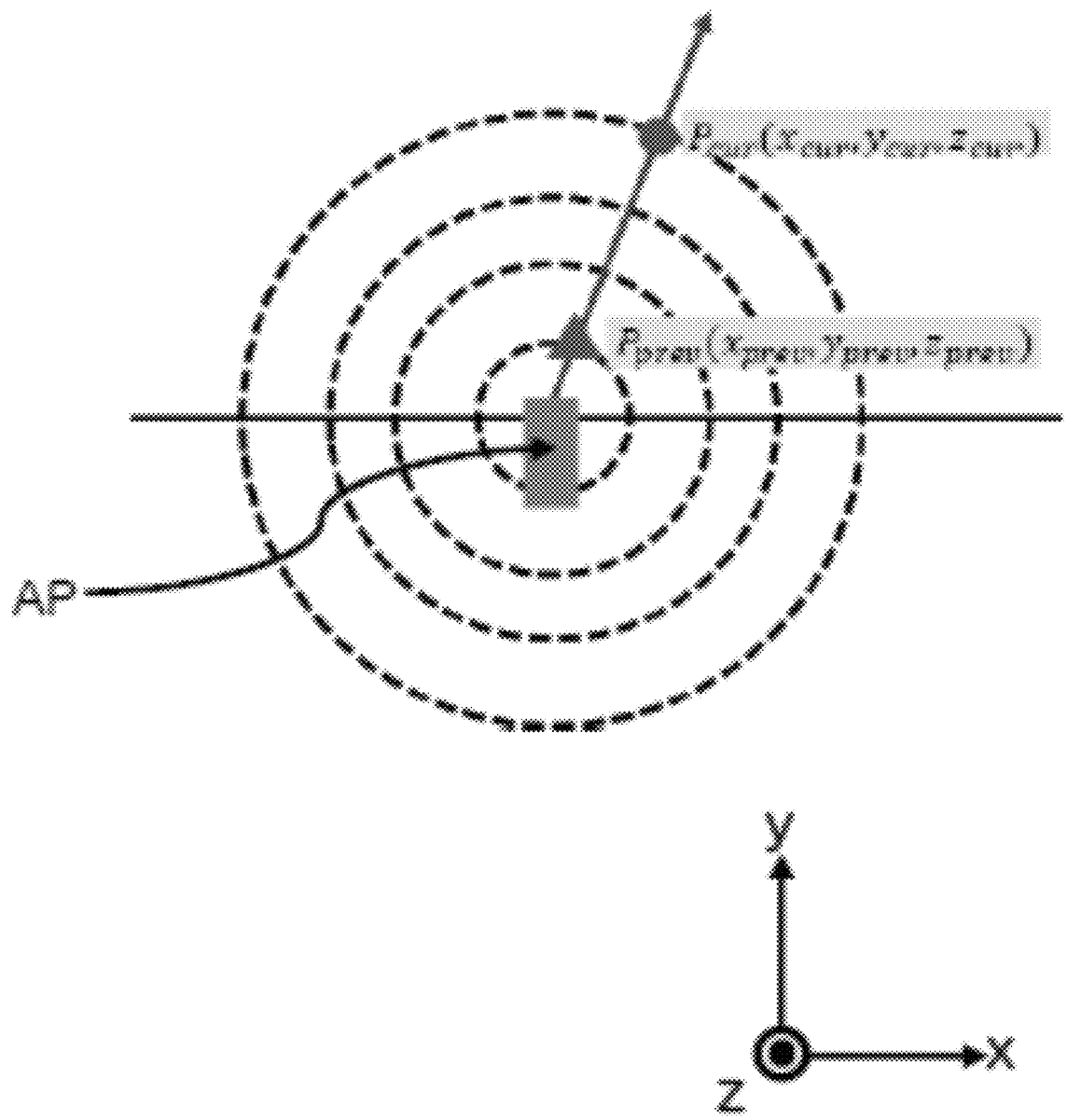
FIG. 11 is a diagram showing a target point and a neighboring point by way of example.

FIG. 11 is a diagram showing the target point and the neighboring point by way of example.

Referring to FIG. 11, the target point is denoted by "Pcur," and xcur, ycur, and zcur represent the x-axis, y-axis, and z-axis coordinates of the target point Pcur, respectively. Furthermore, the neighboring point is denoted by "Pprev", and xprev, yprev, and zprev represent the x-axis, y-axis, and z-axis coordinates of the neighboring point Pprev, respectively.

Figure 12A:
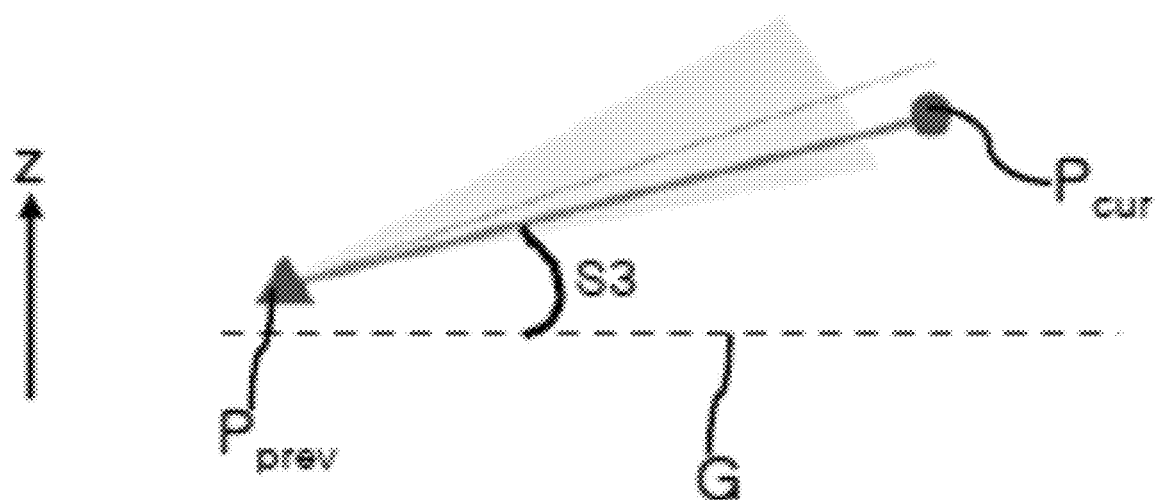
FIG. 12A and FIG. 12B are diagrams for helping understanding steps 130 to 138 shown in FIG. 3.
Figure 12B:
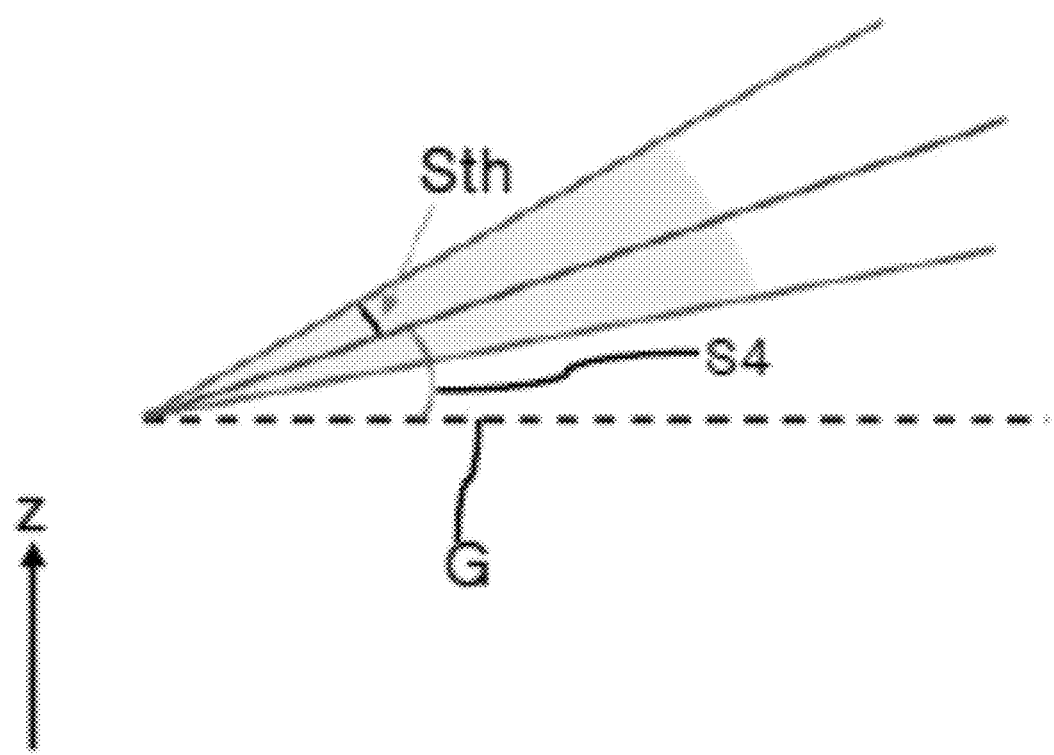

FIG. 12A and FIG. 12B are diagrams for helping understanding steps 130 to 138 shown in FIG. 3. Here, reference numeral "G" denotes the ground on which the host vehicle is located.

As illustrated in FIG. 12A, the third inclination S3 may be obtained using the target point Pcur and the neighboring point Pprev (step 130).

Figure 13:
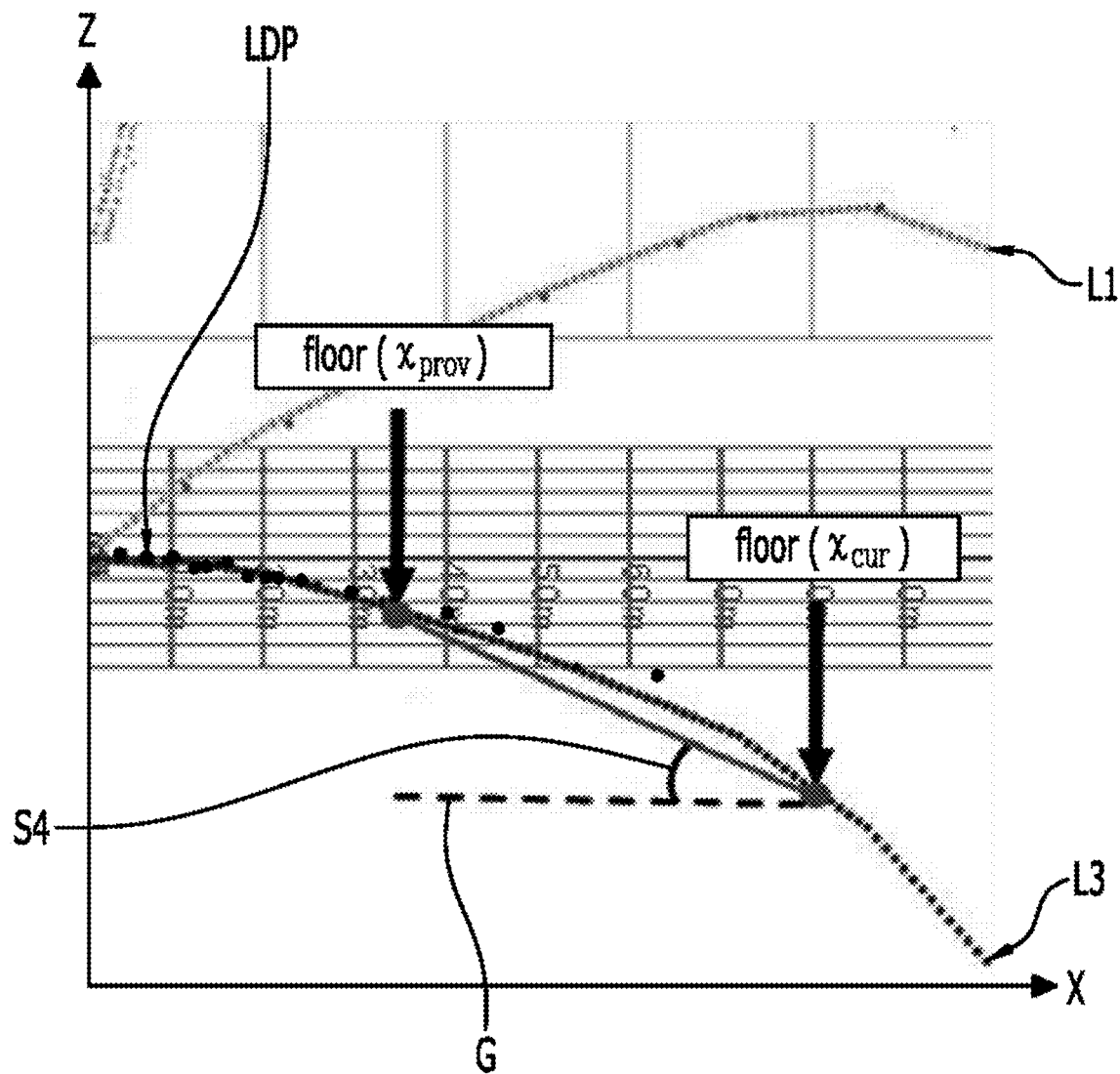
FIG. 13 is a diagram for helping understanding step 132 shown in FIG. 3.

FIG. 13 is a diagram for helping understanding step 132 shown in FIG. 3. Since L1, L3, and LDP in FIG. 13 have the same meaning as in FIG. 7, the same reference numerals are used. Here, floor(xprev) represents a value obtained by integerizing the height, which is a z-axis value in the third line segment L3 corresponding to the x-axis coordinate of the neighboring point Pprev (hereinafter referred to as a "first altitude value"), and floor(xcur) represents a value obtained by integerizing the height, which is a z-axis value in the third line segment L3 corresponding to the x-axis coordinate of the target point Pcur (hereinafter referred to as a "second altitude value").

After step 130, a fourth inclination S4 is obtained using points that match the LiDAR points, among the rotated GPS altitude points (step 132). The first and second altitude values in the third line segment L3, which includes the rotated GPS altitude points, are points that match the LiDAR points. That is, referring to FIG. 13, the first altitude value corresponds to the z-axis value of the point in the third line segment L3 that matches the x-axis coordinate of the target point Pcur, which is a LiDAR point, and the second altitude value corresponds to the z-axis value of the point in the third line segment L3 that matches the x-axis coordinate of the neighboring point Pprev, which is a LiDAR point. Accordingly, it is possible to obtain the fourth inclination S5 using the first altitude value and the second altitude value. This fourth inclination S4 is shown in FIG. 12B.

After step 132, as expressed using Equation 1 below, whether the absolute value of the difference between the third inclination S3 and the fourth inclination S4 is less than a threshold inclination Sth is checked (step 134).

$$|\Delta S| < Sth \qquad \text{[Equation 1]}$$

Here, ΔS represents the result of subtracting the third inclination S3 from the fourth inclination S4.

For example, the threshold inclination Sth may be 0.5°, but the exemplary embodiments are not limited as to the specific value of threshold inclination.

If the absolute value is less than the threshold inclination Sth, it is determined that the target point is a ground point (step 136). However, if the absolute value is not less than the threshold inclination Sth, it is determined that the target point is an object point (step 138).

As shown in FIG. 3, step 140 may be performed after step 136 or step 138 is performed, or may be performed after other preprocessing functions are performed.

Hereinafter, an object-tracking apparatus using a LiDAR sensor according to an exemplary embodiment will be described with reference to the accompanying drawings.

Figure 14:
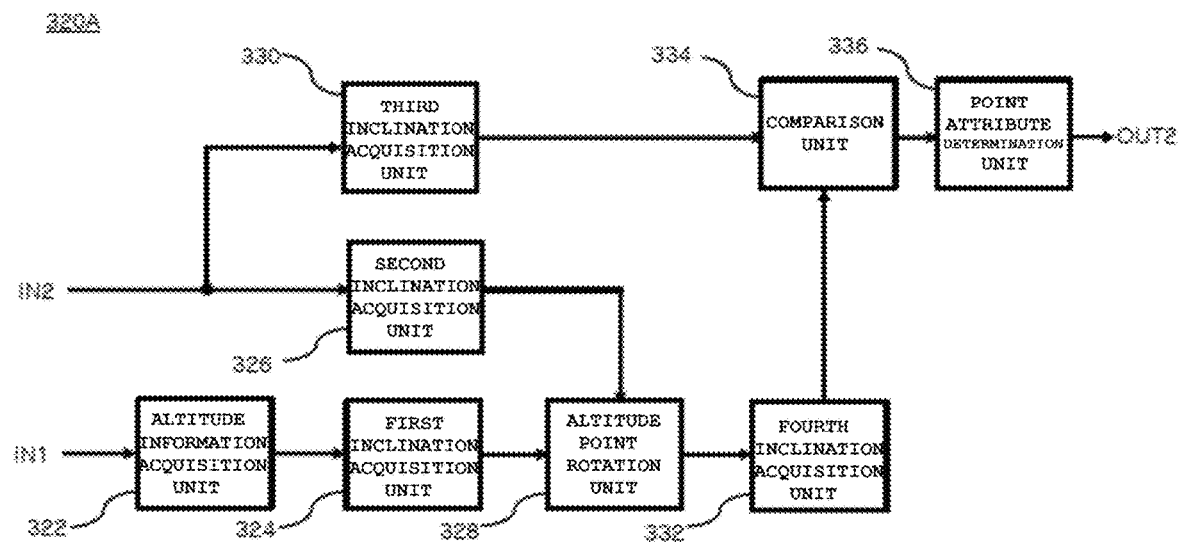
FIG. 14 is a block diagram of the object-tracking apparatus using a LiDAR sensor according to the embodiment.

FIG. 14 is a block diagram of an object-tracking apparatus 320A using a LiDAR sensor according to an exemplary embodiment of the present invention.

The object-tracking apparatus 320A shown in FIG. 14 may be included in the preprocessing unit 320 shown in FIG. 2, but the exemplary embodiments are not limited thereto.

Although the object-tracking method 120A shown in FIG. 3 will be referred to as being performed by the object-tracking apparatus 320A shown in FIG. 14, the exemplary embodiments are not limited thereto. That is, according to another exemplary embodiment of the present invention, the object-tracking method 120A shown in FIG. 3 may be performed by an object-tracking apparatus configured differently from the object-tracking apparatus 320A shown in FIG. 14. In addition, although the object-tracking apparatus 320A shown in FIG. 14 will be referred to as performing the object-tracking method 120A shown in FIG. 3, the exemplary embodiments are not limited thereto.

An altitude information acquisition unit 322 acquires altitude information of the vehicle driving region, and outputs the acquired altitude information to a first inclination acquisition unit 324. That is, the altitude information acquisition unit 322 may perform step 122 shown in FIG. 3.

Figure 15:
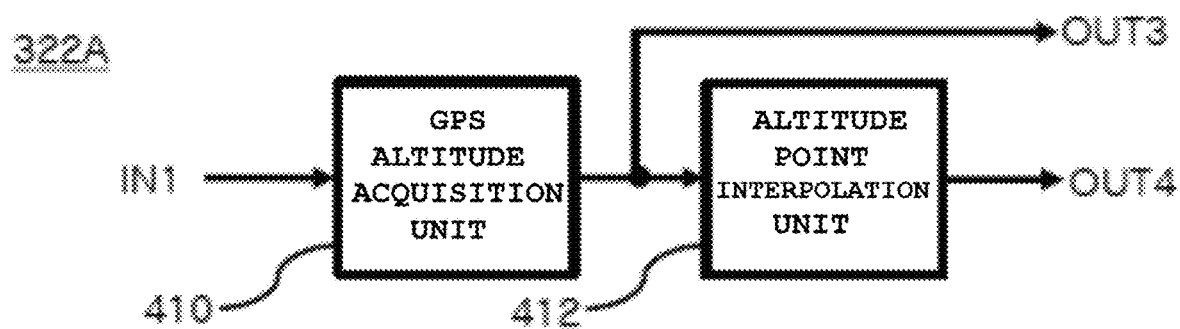
FIG. 15 is a block diagram of an exemplary embodiment of the altitude information acquisition unit shown in FIG. 14.

FIG. 15 is a block diagram of an exemplary embodiment 322A of the altitude information acquisition unit 322 shown in FIG. 14. The altitude information acquisition unit 322A may include a GPS altitude acquisition unit 410 and an altitude point interpolation unit 412.

The GPS altitude acquisition unit 410 may acquire GPS altitude points of the vehicle driving region, and may output the acquired GPS altitude points to the altitude point interpolation unit 412 and to the first inclination acquisition unit 324 through an output terminal OUT3. That is, the GPS altitude acquisition unit 322 may perform step 210 shown in FIG. 4. For example, the GPS altitude acquisition unit 410 may acquire GPS altitude points using a GPS signal received through an input terminal IN1.

The altitude point interpolation unit 412 may generate, using interpolation, interpolated altitude points indicating the altitudes of the regions located between the GPS altitude points within the vehicle driving region, and may output the generated interpolated altitude points to the first inclination acquisition unit 324 through an output terminal OUT4. That is, the altitude point interpolation unit 412 may perform step 212 shown in FIG. 4.

In the present way, the altitude information acquisition units 322 (322A) may acquire altitude information including at least some of the GPS altitude points or the interpolated altitude points, and may output the acquired altitude information to the first inclination acquisition unit 324.

Meanwhile, referring again to FIG. 14, the first inclination acquisition unit 324 may form a first inclination S1 using the GPS altitude points of the vehicle driving region, and may output the first inclination S1 to an altitude point rotation unit 328. Alternatively, the first inclination acquisition unit 324 may form the first inclination S1 using the interpolated altitude points as well as the GPS altitude points. Alternatively, the first inclination acquisition unit 324 may form the first inclination S1 using the interpolated altitude points instead of the GPS altitude points.

That is, the first inclination acquisition unit 324 may perform step 124 shown in FIG. 3.

A second inclination acquisition unit 326 may detect LiDAR points related to a driving lane, among the LiDAR points acquired by the LiDAR sensor 310 and received through an input terminal IN2, may determine a second inclination S2 using the detected LiDAR points related to the driving lane, and may output the determined second inclination S2 to the altitude point rotation unit 328. That is, the second inclination acquisition unit 326 may perform step 126 shown in FIG. 3.

Figure 16:
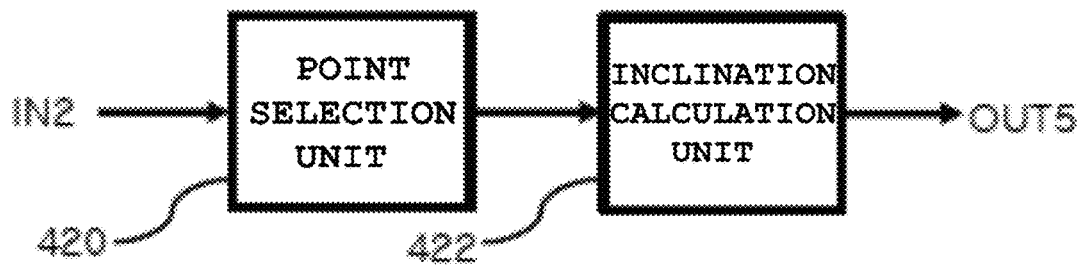
FIG. 16 is a block diagram of an exemplary embodiment of the second inclination acquisition unit shown in FIG. 14.

FIG. 16 is a block diagram of an exemplary embodiment 326A of the second inclination acquisition unit 326 shown in FIG. 14. The second inclination acquisition unit 326A may include a point selection unit 420 and an inclination calculation unit 422.

The point selection unit 420 may select LiDAR points corresponding to the driving lane from among the LiDAR points received through the input terminal IN2, and may output the selected LiDAR points to the inclination calculation unit 422. That is, the point selection unit 420 may perform step 230 shown in FIG. 8.

Figure 17:
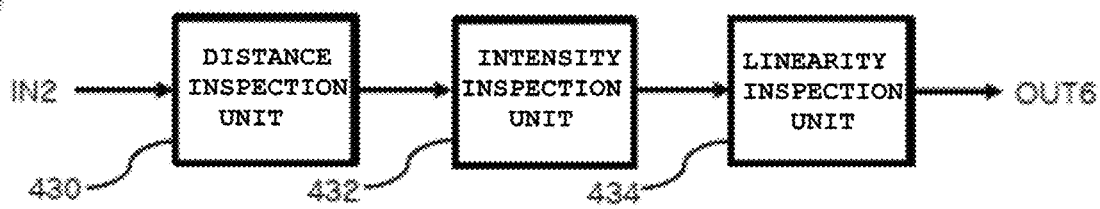
FIG. 17 is a block diagram of an exemplary embodiment of the point selection unit shown in FIG. 16.

FIG. 17 is a block diagram of an exemplary embodiment 420A of the point selection unit 420 shown in FIG. 16. The point selection unit 420A may include a distance inspection unit 430, an intensity inspection unit 432, and a linearity inspection unit 434.

The distance inspection unit 430 may select LiDAR points present within a predetermined distance centered on the host vehicle from among the LiDAR points received through the input terminal IN2, and may output the selected LiDAR points to the intensity inspection unit 432. That is, the distance inspection unit 430 may perform step 232 shown in FIG. 9.

The intensity inspection unit 432 may select LiDAR points having relatively high intensity from the selected LiDAR points present within the predetermined distance, and may output the selected LiDAR points to the linearity inspection unit 434. That is, the intensity inspection unit 432 may perform step 234 shown in FIG. 9.

The linearity inspection unit 434 may select LiDAR points having a linear property as LiDAR points corresponding to the driving lane from among the selected LiDAR points having relatively high intensity, and may output the selected LiDAR points to the inclination calculation unit 422 through an output terminal OUT6. That is, the linearity inspection unit 434 may perform step 236 shown in FIG. 9.

The inclination calculation unit 422 may determine a second inclination S2 using the LiDAR points selected by the point selection unit 420, and may output the determined second inclination S2 to the altitude point rotation unit 328 through an output terminal OUT5. At the instant time, the inclination calculation unit 422 may generate the second inclination S2 using only points belonging to the second inspection target region, among the points selected by the point selection unit 420. That is, the inclination calculation unit 422 may perform steps 240 and 250 shown in FIG. 8.

Referring again to FIG. 14, the altitude point rotation unit 328 may rotate the GPS altitude points using the first inclination S1 provided from the first inclination acquisition unit 324 and the second inclination S2 provided from the second inclination acquisition unit 326, and may output the rotated GPS altitude points to a fourth inclination acquisition unit 332. That is, the altitude point rotation unit 328 may perform step 128 shown in FIG. 3.

Figure 18:
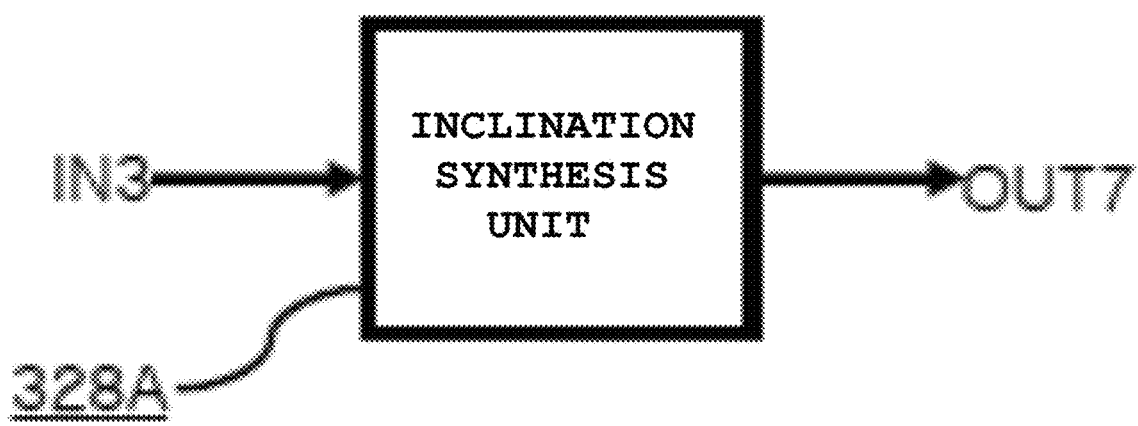
FIG. 18 is a block diagram showing an exemplary embodiment of the altitude point rotation unit shown in FIG. 14.

FIG. 18 is a block diagram showing an exemplary embodiment of the altitude point rotation unit 328 shown in FIG. 14. The altitude point rotation unit 328 may include an inclination synthesis unit 328A.

The inclination synthesis unit 328A may sum the first inclination S1 and the second inclination S2 received through the input terminal IN3, and may output the rotated GPS altitude points formed by the summed inclination to the fourth inclination acquisition unit 332 through an output terminal OUT7.

Referring again to FIG. 14, the third inclination acquisition unit 330 may determine a third inclination S3 using the target point and the neighboring point, among the LiDAR points received through the input terminal IN2, and may output the determined third inclination S3 to a comparison unit 334. That is, the third inclination acquisition unit 330 is configured to perform step 130 shown in FIG. 3.

The fourth inclination acquisition unit 332 may determine a fourth inclination S4 using points that match the LiDAR points (i.e., the target point and the neighboring point), among the rotated GPS altitude points provided from the altitude point rotation unit 328, and may output the determined fourth inclination S4 to the comparison unit 334. As described above with reference to step 132 shown in FIG. 3, the fourth inclination acquisition unit 332 may determine a fourth inclination S4 using a first altitude value and a second altitude value. That is, the fourth inclination acquisition unit 332 is configured to perform step 132 shown in FIG. 3.

The comparison unit 334 may compare the absolute value of the difference between the third inclination S3 and the fourth inclination S4 with a threshold inclination Sth, and may output the result of the comparison to a point attribute determination unit 336. That is, the comparison unit 334 is configured to perform step 134 shown in FIG. 3. Here, the threshold inclination Sth may be 0.5°.

The point attribute determination unit 336 may determine whether the target point is a ground point or an object point in response to the result of the comparison by the comparison unit 334, and may output the result of the determination through an output terminal OUT2. That is, the point attribute determination unit 336 is configured to perform steps 136 and 138 shown in FIG. 3.

As described above, the preprocessing unit 320 shown in FIG. 2 may preprocess the acquired LiDAR points, and may include the altitude information acquisition unit 322, the first inclination acquisition unit 324, the second inclination acquisition unit 326, the third inclination acquisition unit 330, the fourth inclination acquisition unit 332, the altitude point rotation unit 328, the comparison unit 334, and the point attribute determination unit 336.

Meanwhile, a computer-readable recording medium in which a program for executing the method of tracking an object using the LiDAR sensor 310 is recorded may store a program for implementing a function of forming a first inclination using GPS altitude points of a vehicle driving region, a function of detecting a driving lane using LiDAR points of a vehicle and determining a second inclination using the detected driving lane, a function of rotating the GPS altitude points using the first inclination and the second inclination, a function of obtaining a third inclination using a target point and a neighboring point, which belongs to a previous layer adjacent to a current layer to which the target point belongs, among the LiDAR points, a function of obtaining a fourth inclination using points that match the LiDAR points, among the rotated GPS altitude points, and a function of determining the target point to be a ground point when the absolute value of the difference between the third inclination and the fourth inclination is less than a threshold inclination.

The computer-readable recording medium includes all kinds of recording devices in which data configured for being read by a computer system are stored. Examples of the computer-readable recording medium include a Read-Only Memory (ROM), a Random Access Memory (RAM), a Compact Disk ROM (CD-ROM), a magnetic tape, a floppy disc, and an optical data storage. The computer-readable recording medium can also be distributed over network-connected computer systems so that the computer-readable code is stored and executed in a distributed fashion. Also, functional programs, code, and code segments for accomplishing the object-tracking method may be easily devised by programmers skilled in the art to which various exemplary embodiments of the present invention pertains.

Hereinafter, an object-tracking method according to a comparative example and the object-tracking method according to the exemplary embodiment will be described with reference to the accompanying drawings.

In the case of the comparative example, a table is constructed using point information theoretically calculated by a LiDAR sensor and arbitrarily determined inclination information, and whether a LiDAR point is a ground point or an object point is determined using the table. An example of the comparative example is included in Korean Patent Laid-Open Publication No. 10-2019-0064798 (entitled "ROAD SURFACE DETECTION SYSTEM USING LIDAR AND ROAD SURFACE DETECTION METHOD USING THE SAME").

In contrast, according to the exemplary embodiment of the present invention, the GPS altitude points are rotated using the first inclination S1 and the second inclination S2 to generate the third line segment L3 including the rotated GPS altitude points, the third inclination S3 is generated using the target point and the neighboring point of the LiDAR points, the fourth inclination S4 is generated using the points of the third line segment L3 that match the LiDAR points, the difference value between the third inclination S3 and the fourth inclination S4 is compared with the threshold inclination Sth, and whether the LiDAR point corresponds to an object point or corresponds to a ground point is checked using the result of the comparison.

Figure 19A:
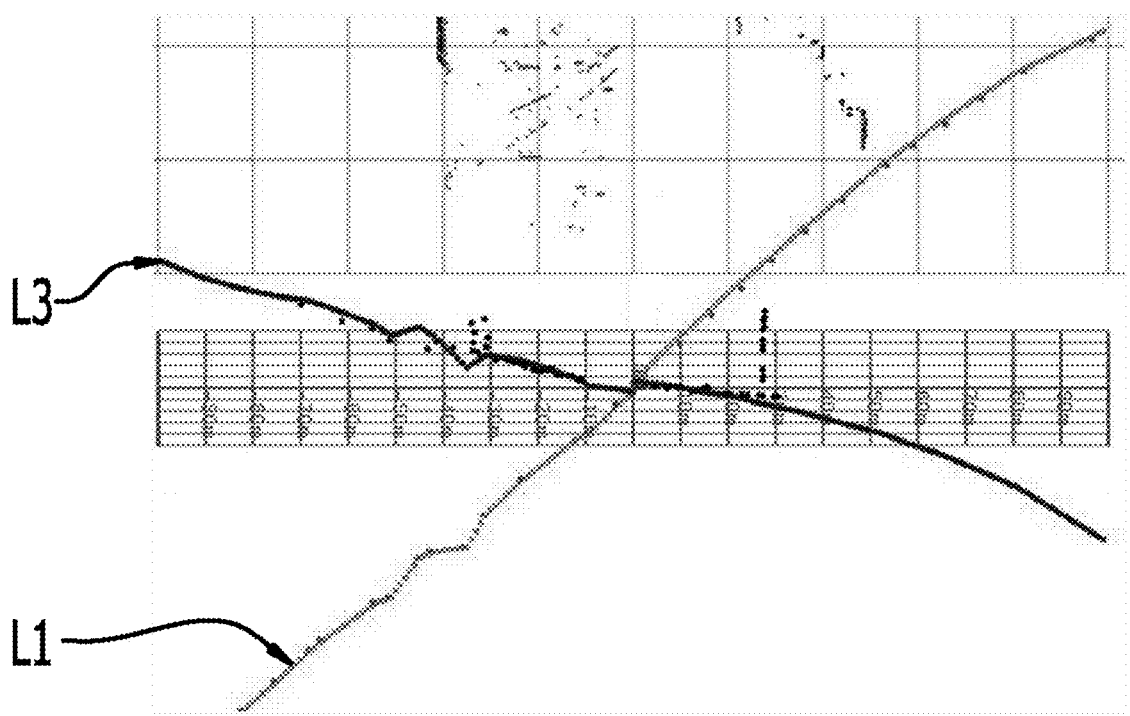
FIG. 19A, FIG. 19B and FIG. 19C show results acquired using object-tracking methods and apparatuses according to a comparative example and the exemplary embodiment when an uphill road is included in a vehicle driving region.
Figure 19B:
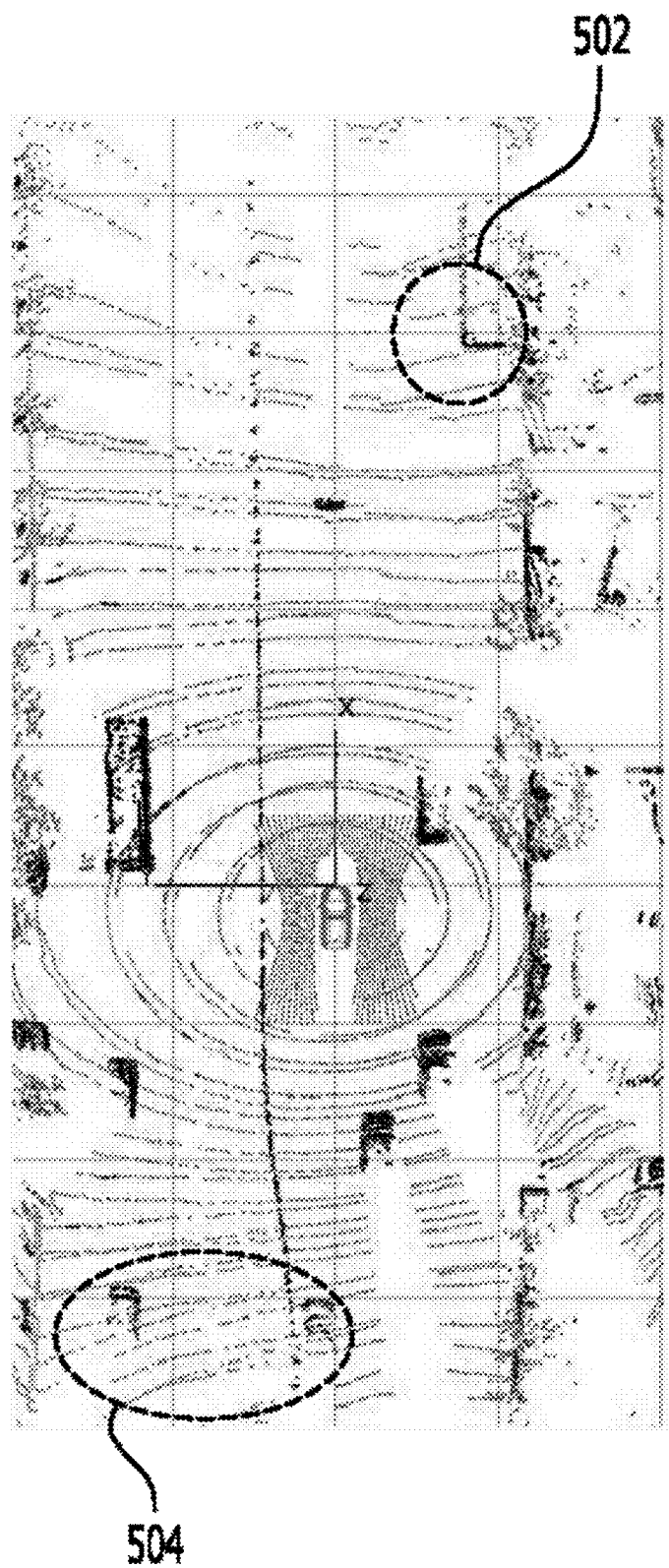
Figure 19C:
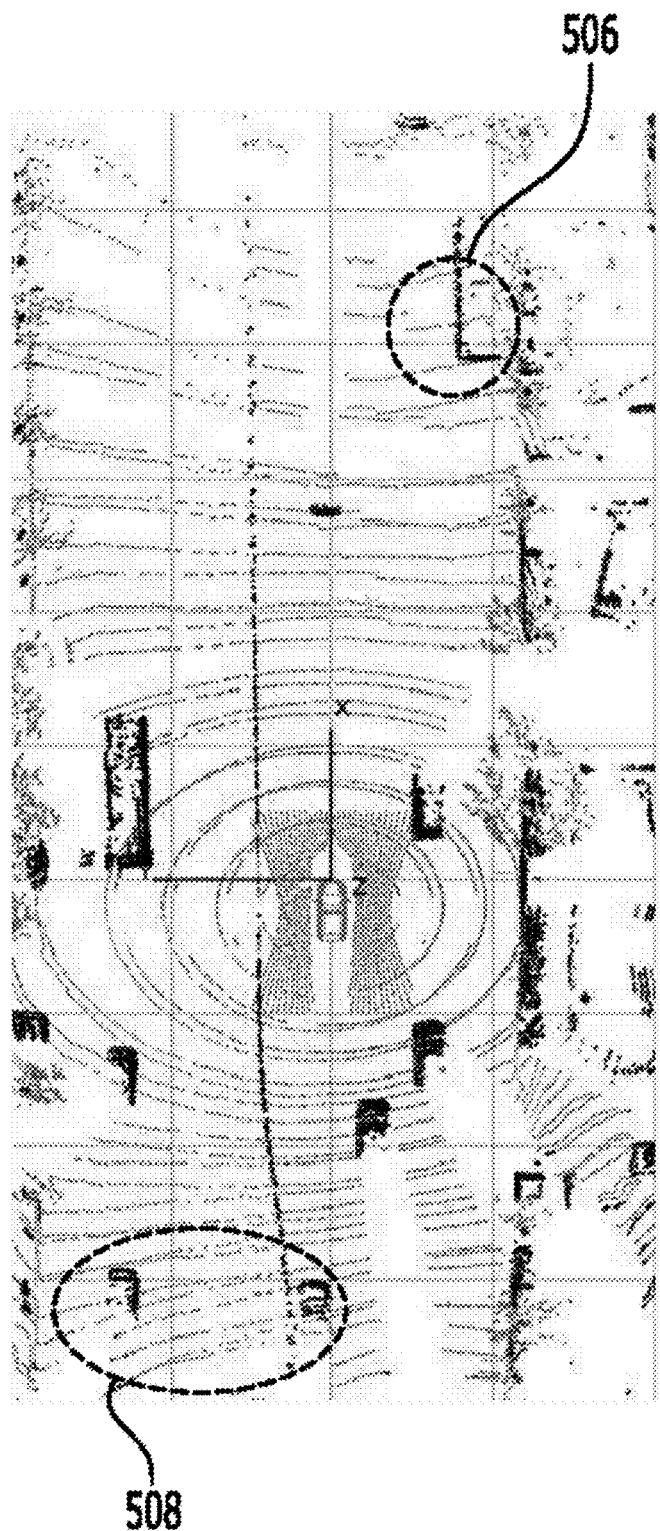

FIG. 19A, FIG. 19B and FIG. 19C show results acquired using the object-tracking methods and apparatuses according to the comparative example and the exemplary embodiment when an uphill road is included in the vehicle driving region. Here, points having relatively small gray scale represent object points, and points having relatively great gray scale represent ground points, among points shown in FIGS. 19B and 19C. Here, as gray scale is smaller, color approaches black color.

In the case of the comparative example, referring to the circular dotted lines 502 and 504 in FIG. 19B, the LiDAR points corresponding to the object are incorrectly determined to be LiDAR points corresponding to the ground, and thus the number of LiDAR points expressing the object is small, so the shape of the object does not appear clearly. For example, some of the LiDAR points expressing the side surface of the left object, among the two objects located in the circular dotted line 504 shown in FIG. 19B, are incorrectly determined to be LiDAR points corresponding to the ground.

In contrast, the number of LiDAR points expressing an object located in the circular dotted line 506 in FIG. 19C, which is the result obtained by the exemplary embodiment using the third line segment L3 shown in FIG. 19A, is greater than the number of LiDAR points expressing an object located in the circular dotted line 502 in FIG. 19B, which is the result obtained by the comparative example. The number of LiDAR points located on the side surface of the left object, among the two objects located in the circular dotted line 508 shown in FIG. 19C, which is the result obtained by the exemplary embodiment of the present invention, is greater than the number of LiDAR points located on the side surface of the left object present in the circular dotted line 504 in FIG. 19B, which is the result obtained by the comparative example, so the shape of the object appears to be more clearly than in the comparative example.

Figure 20A:
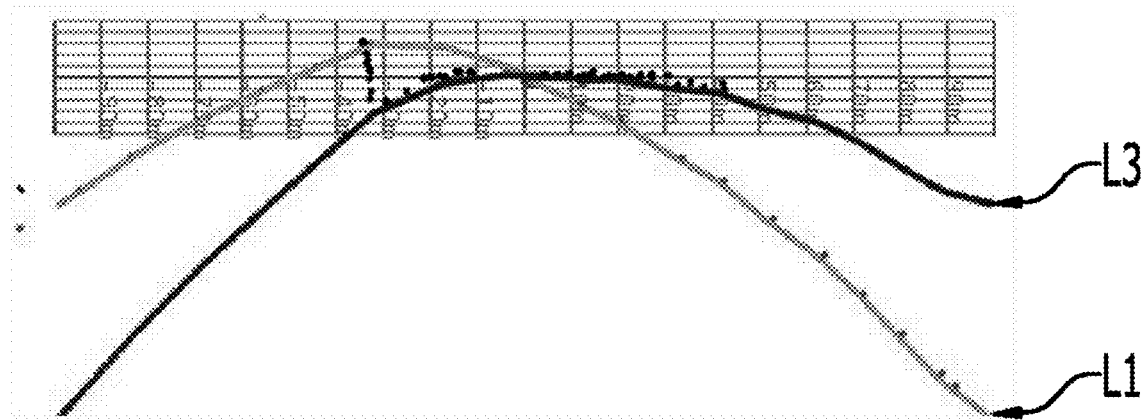
FIG. 20A, FIG. 20B and FIG. 20C show results acquired using the object-tracking methods and apparatuses according to the comparative example and the exemplary embodiment when a downhill road is included in a vehicle driving region.
Figure 20B:
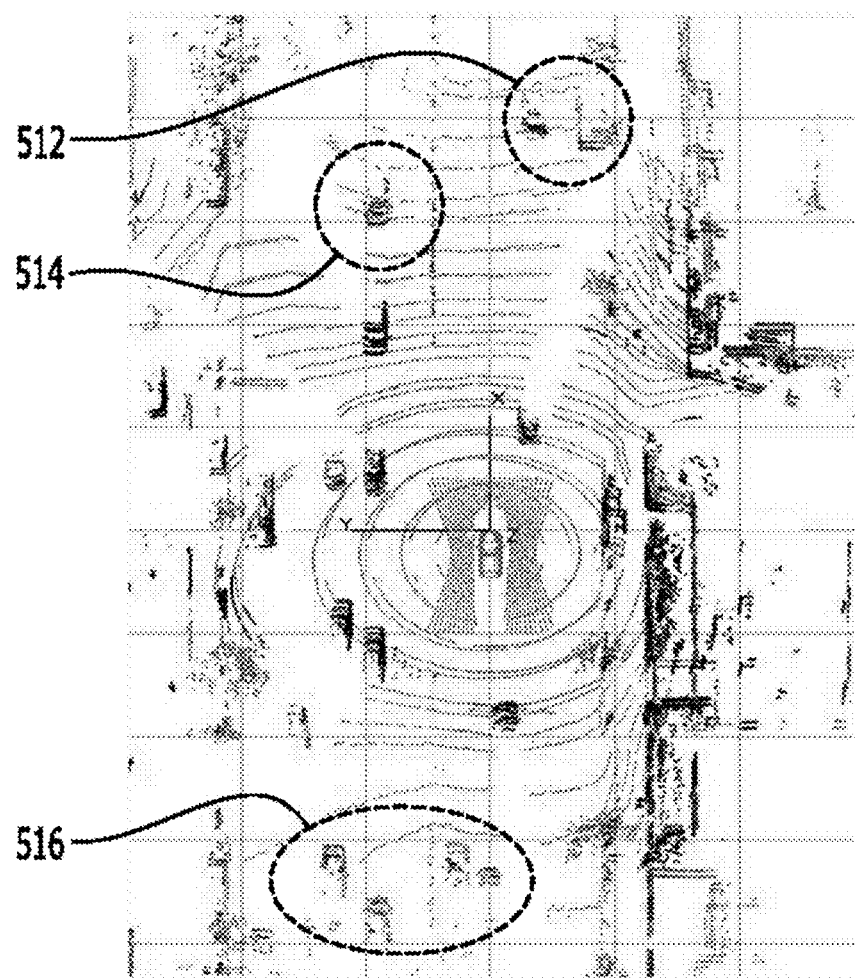
Figure 20C:
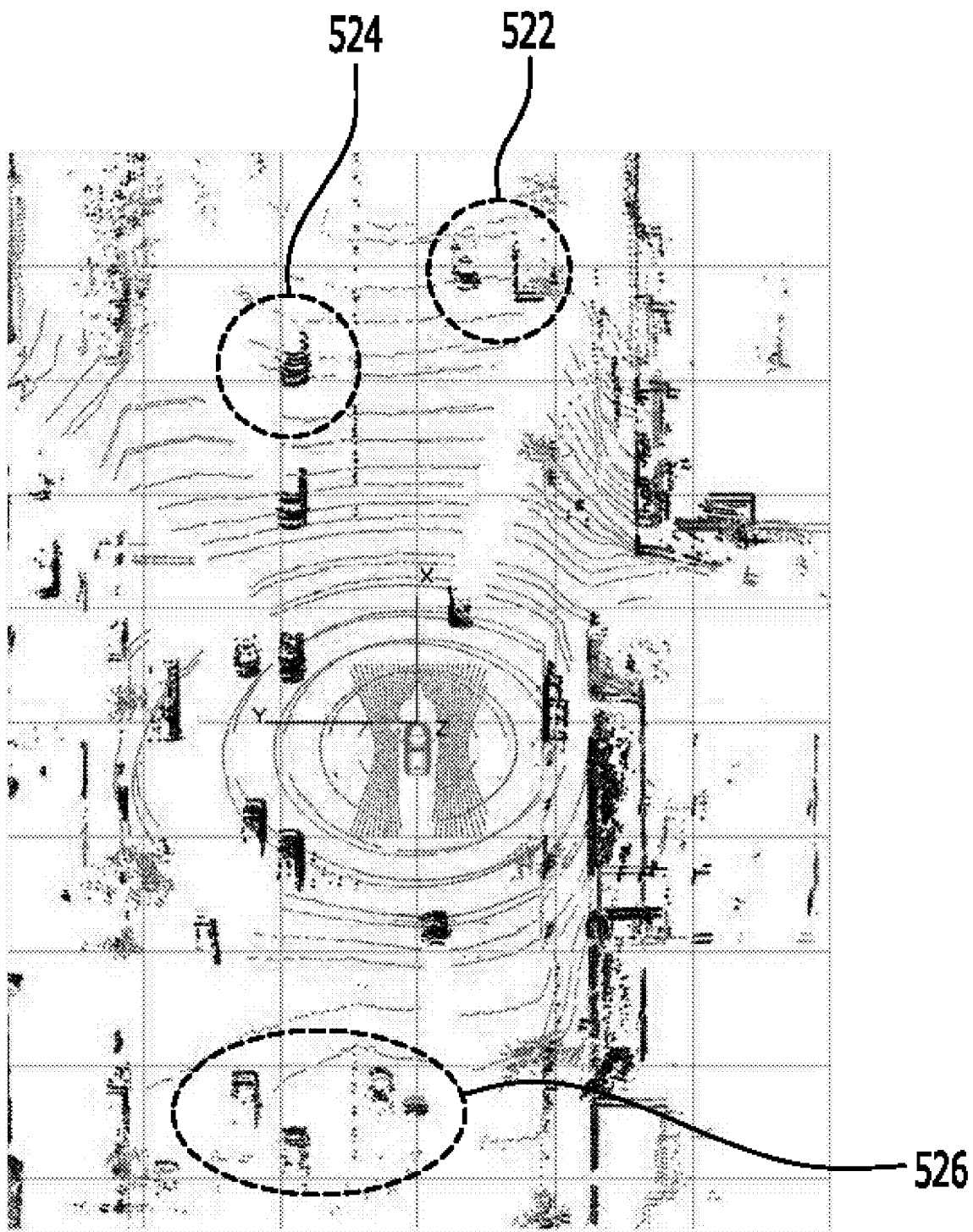

FIG. 20A, FIG. 20B and FIG. 20C show results acquired using the object-tracking methods and apparatuses according to the comparative example and the exemplary embodiment when a downhill road is included in the vehicle driving region. Here, points having relatively small gray scale represent object points, and points having relatively great gray scale represent ground points, among points shown in FIGS. 20B and 20C.

In the case of the comparative example, referring to the circular dotted lines 512, 514 and 516 in FIG. 20B, the LiDAR points corresponding to the object are incorrectly determined to be LiDAR points corresponding to the ground, and thus the number of LiDAR points expressing the object is small, so that the shape of the object does not appear clearly. For example, some of the LiDAR points expressing four objects located in the circular dotted line 516 shown in FIG. 20B are incorrectly determined to be LiDAR points corresponding to the ground.

In contrast, the number of LiDAR points corresponding to objects located in the circular dotted lines 522, 524 and 526 in FIG. 20C, which is the result obtained by the exemplary embodiment using the third line segment L3 shown in FIG. 20A, is greater than the number of LiDAR points corresponding to objects located in the circular dotted lines 512, 514 and 516 in FIG. 20B, which is the result obtained by the comparative example.

Figure 21A:
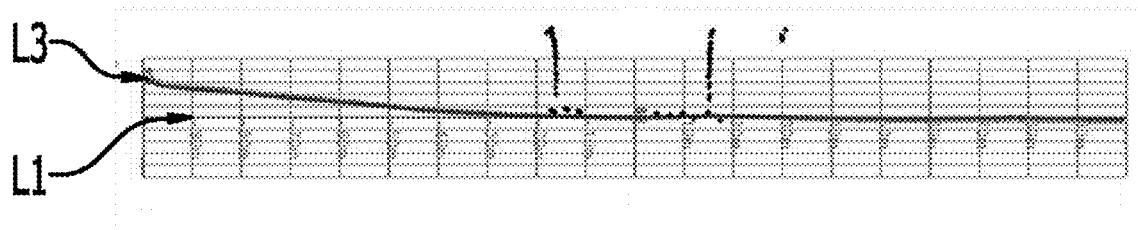
FIG. 21A, FIG. 21B and FIG. 21C show results acquired using the object-tracking methods and apparatuses according to the comparative example and the exemplary embodiment when no downhill road or no uphill road is included in a vehicle driving region.
Figure 21B:
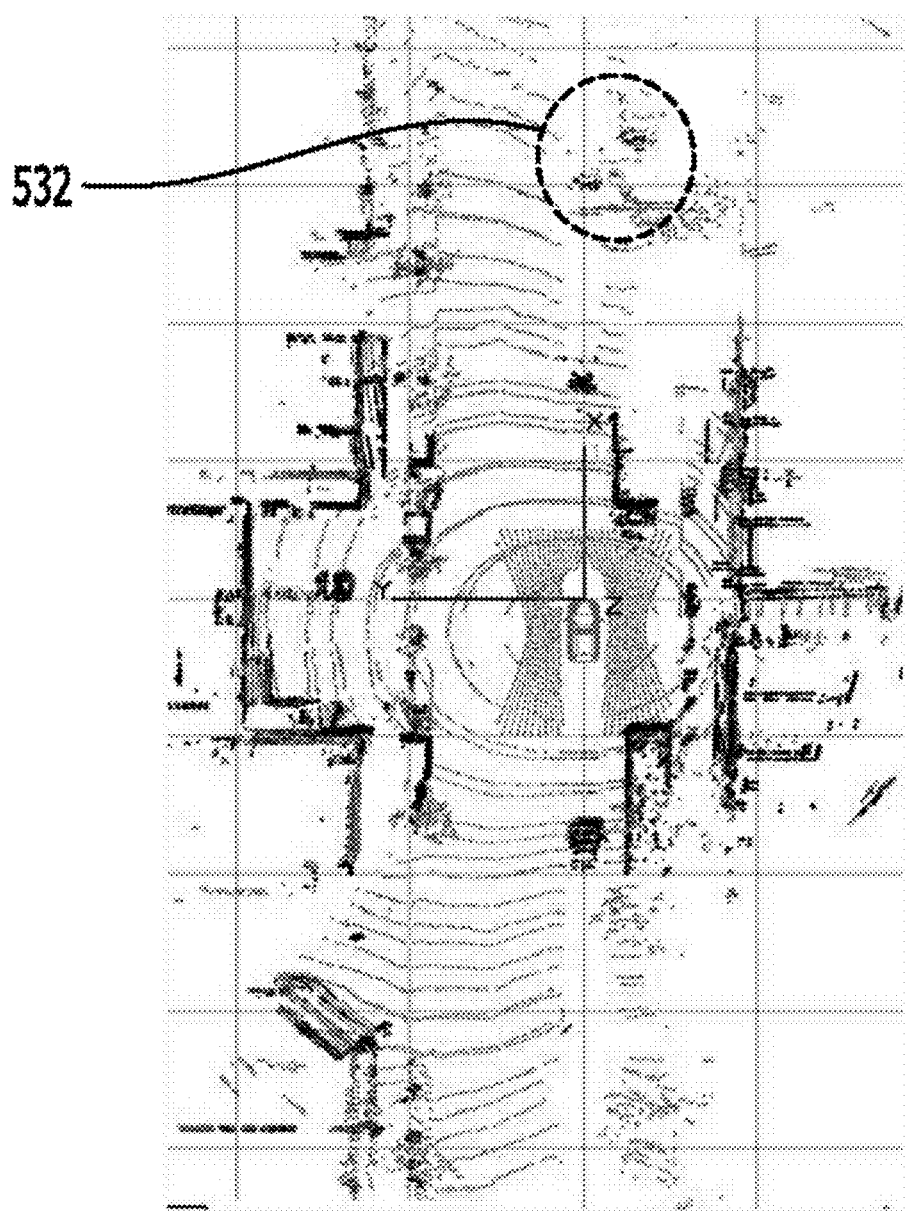
Figure 21C:
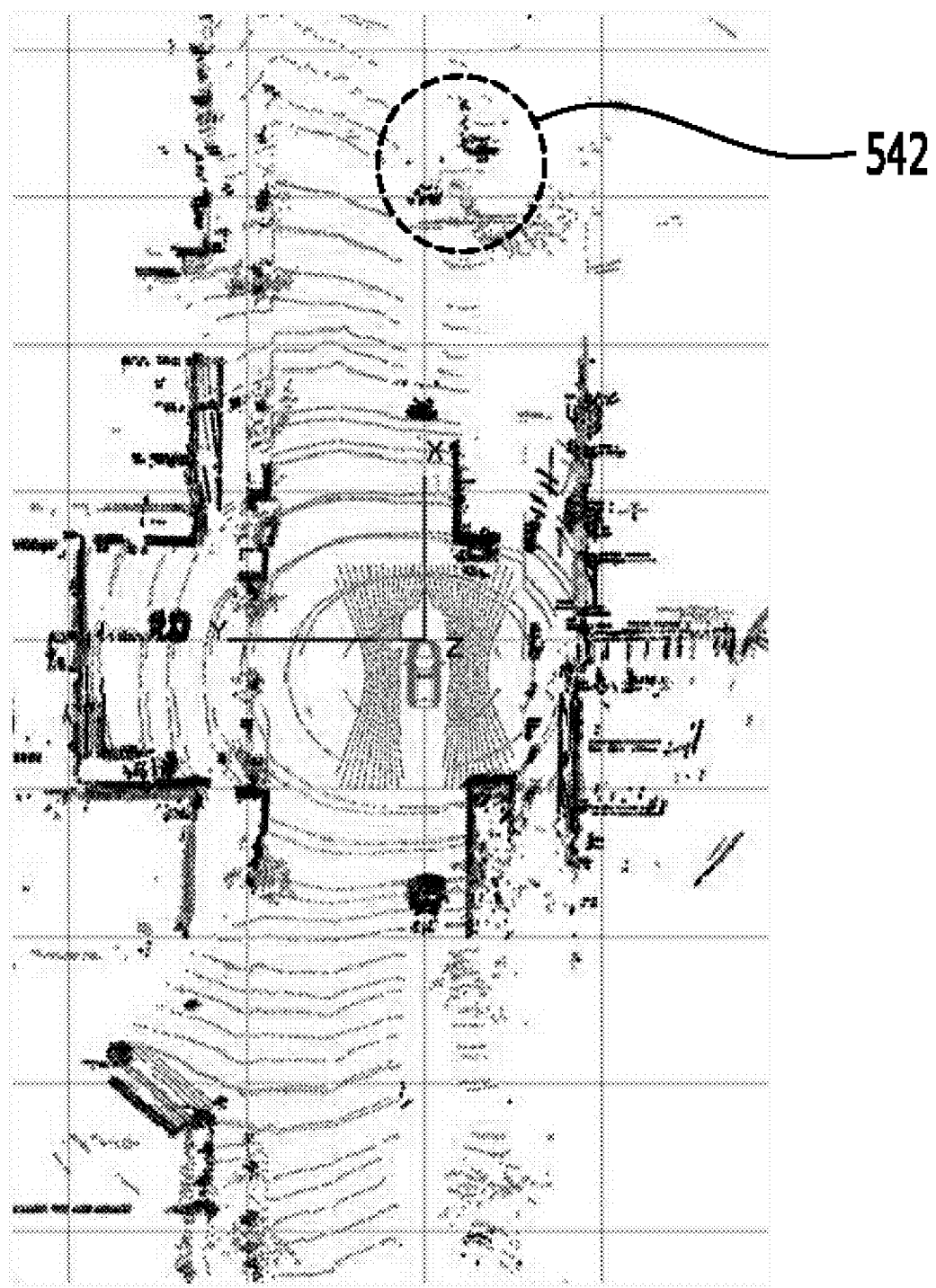

FIG. 21A, FIG. 21B and FIG. 21C show results acquired using the object-tracking methods and apparatuses according to the comparative example and the exemplary embodiment when no downhill road or no uphill road is included in the vehicle driving region. Here, points having relatively small gray scale represent object points, and points having relatively great gray scale represent ground points, among points shown in FIGS. 21B and 21C.

In the case of the comparative example, referring to the circular dotted line 532 in FIG. 21B, the LiDAR points corresponding to the object are incorrectly determined to be LiDAR points corresponding to the ground, and thus the number of LiDAR points expressing the object is small, so that the shape of the object does not appear clearly. For example, the LiDAR points expressing two objects located in the circular dotted line 532 shown in FIG. 21B are incorrectly determined to be LiDAR points corresponding to the ground.

In contrast, the number of LiDAR points corresponding to two objects located in the circular dotted line 542 in FIG. 21C, which is the result obtained by the exemplary embodiment using the third line segment L3 shown in FIG. 21A, is greater than the number of LiDAR points corresponding to the objects located in the circular dotted line 532 in FIG. 21B, which is the result obtained by the comparative example.

As described above, according to the exemplary embodiment of the present invention, it is possible to accurately determine whether the LiDAR points are ground points or object points, and thus the number of LiDAR points expressing an object is greater than in the comparative example, facilitating more accurate tracking of an object.

Furthermore, in the case of the comparative example, when determining whether LiDAR points are ground points or object points, the determination is affected by the actual driving state and the road environment, and the execution time is long. In the case of the comparative example, in which whether LiDAR points are ground points or object points is determined using a table, object-tracking performance may be affected by the state of the vehicle or the degree of unevenness or inclination of the road.

In contrast, the exemplary embodiment uses GPS altitude points, which are altitude information of the actual road, in real time, more accurately determining whether LiDAR points are ground points or object points while being less affected by the actual driving state and the external environment, such as road conditions, than the comparative example, and achieving the determination merely by comparing inclinations, thus shortening the execution time compared to the comparative example.

As is apparent from the above description, according to the method and apparatus configured for tracking an object using a LiDAR sensor and the recording medium storing a program to execute the method according to the embodiments, it is possible to accurately determine whether LiDAR points are points corresponding to the ground or points corresponding to an object, increasing the number of LiDAR points expressing the object, thus facilitating more accurate tracking of the object. In addition, the exemplary embodiments use altitude information of the actual road in real time, more accurately determining whether LiDAR points are points corresponding to the ground or points corresponding to an object while being less affected by the actual driving state and the external environment, such as road conditions, and shortening the execution time.

However, the effects achievable through the present invention are not limited to the above-mentioned effects, and other effects not mentioned herein will be clearly understood by those skilled in the art from the above description.

The above-described various embodiments may be combined with each other without departing from the scope of the present invention unless they are incompatible with each other.

In addition, for any element or process that is not described in detail in any of the various embodiments, reference may be made to the description of an element or a process having the same reference numeral in another exemplary embodiment unless otherwise specified.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of tracking an object using a Light Detection and Ranging (LiDAR) sensor, the method comprising:
    forming a first inclination using Global Positioning System (GPS) altitude points of a vehicle driving region;
    detecting a driving lane using LiDAR points of a vehicle and determining a second inclination using the detected driving lane;
    rotating the GPS altitude points using the first inclination and the second inclination;
    obtaining a third inclination using a target point and a neighboring point, among the LiDAR points, the neighboring point belonging to a previous layer adjacent to a current layer to which the target point belongs;
    obtaining a fourth inclination using points that match the LiDAR points, among the rotated GPS altitude points; and
    determining the target point to be a ground point when an absolute value of a difference between the third inclination and the fourth inclination is less than a threshold inclination.

2. The method of claim 1, further including:
    acquiring the GPS altitude points of the vehicle driving region; and
    generating interpolated altitude points indicating altitudes of regions located between the GPS altitude points within the vehicle driving region,
    wherein the first inclination is formed using at least some of the GPS altitude points or the interpolated altitude points.

3. The method of claim 2,
    wherein the forming the first inclination further includes selecting a first inspection target region located within a first distance centered on the vehicle within the vehicle driving region, and
    wherein the first inclination is formed using at least some of the GPS altitude points or the interpolated altitude points present within the first inspection target region.

4. The method of claim 3, wherein the detecting the driving lane includes:
    selecting LiDAR points present within a predetermined distance centered on the vehicle from among the LiDAR points;
    selecting LiDAR points having relatively high intensity from the selected LiDAR points present within the predetermined distance; and
    selecting LiDAR points having a linear property as LiDAR points corresponding to the driving lane from among the LiDAR points having relatively high intensity.

5. The method of claim 4,
    wherein the determining the second inclination further includes selecting a second inspection target region located within a second distance centered on the vehicle within the vehicle driving region, and
    wherein the second inclination is determined using LiDAR points present within the second inspection target region, among the selected LiDAR points corresponding to the driving lane.

6. The method of claim 5, wherein the first distance and the second distance are identical to each other.

7. The method of claim 1, wherein the rotated GPS altitude points form an inclination equivalent to a sum of the first inclination and the second inclination.

8. The method of claim 1, wherein the threshold inclination is 0.5°.

9. The method of claim 1, further including:
preprocessing the LiDAR points;
clustering the preprocessed LiDAR points into meaningful units according to predetermined criteria; and
analyzing a shape of an object using the clustered LiDAR points,
wherein the obtaining the first to fourth inclinations, the rotating the GPS altitude points, and the determining whether the target point is the ground point are performed in the preprocessing the LiDAR points.

10. An apparatus of tracking an object using a Light Detection and Ranging (LiDAR) sensor, the apparatus comprising:
a first inclination acquisition unit configured to form a first inclination using Global Positioning System (GPS) altitude points of a vehicle driving region;
a second inclination acquisition unit configured to detect a driving lane using LiDAR points of a vehicle and to determine a second inclination using the driving lane;
an altitude point rotation unit configured to rotate the GPS altitude points using the first inclination and the second inclination;
a third inclination acquisition unit configured to determine a third inclination using a target point and a neighboring point, among the LiDAR points, the neighboring point belonging to a previous layer adjacent to a current layer to which the target point belongs;
a fourth inclination acquisition unit configured to determine a fourth inclination using points that match the LiDAR points, among the rotated GPS altitude points;
a comparison unit configured to compare an absolute value of a difference between the third inclination and the fourth inclination with a threshold inclination; and
a point attribute determination unit configured to determine whether the target point is a ground point in a response to a result of comparison by the comparison unit.

11. The apparatus of claim 10, further including:
a GPS altitude acquisition unit configured to acquire the GPS altitude points of the vehicle driving region.

12. The apparatus of claim 11, further including:
an altitude point interpolation unit configured to generate interpolated altitude points indicating altitudes of regions located between the GPS altitude points within the vehicle driving region,
wherein the first inclination acquisition unit forms the first inclination using at least some of the GPS altitude points or the interpolated altitude points.

13. The apparatus of claim 10, wherein the second inclination acquisition unit includes:
a point selection unit configured to select LiDAR points corresponding to the driving lane from among the LiDAR points; and
an inclination determination unit configured to determine the second inclination using the LiDAR points selected by the point selection unit.

14. The apparatus of claim 13, wherein the point selection unit includes:

a distance inspection unit configured to select LiDAR points present within a predetermined distance centered on the vehicle from among the LiDAR points;
an intensity inspection unit configured to select LiDAR points having relatively high intensity from the selected LiDAR points present within the predetermined distance; and
a linearity inspection unit configured to select LiDAR points having a linear property as LiDAR points corresponding to the driving lane from among the LiDAR points having relatively high intensity.

15. The apparatus of claim 10, wherein the altitude point rotation unit includes an inclination synthesis unit configured to sum the first inclination and the second inclination and to output the rotated GPS altitude points formed at a summed inclination.

16. The apparatus of claim 10, wherein the threshold inclination is 0.5°.

17. The apparatus of claim 10, further including:
the LiDAR sensor configured to acquire the LiDAR points related to the vehicle driving region;
a preprocessing unit configured to preprocess the LiDAR points, the preprocessing unit including the first inclination acquisition unit, the second inclination acquisition unit, the third inclination acquisition unit and the fourth inclination acquisition unit, the altitude point rotation unit, the comparison unit, and the point attribute determination unit;
a clustering unit configured to cluster the preprocessed LiDAR points into meaningful units according to predetermined criteria; and
a shape analysis unit configured to analyze a shape of an object using the clustered LiDAR points.

18. A computer-readable recording medium in which a program for executing a method of tracking an object using a Light Detection and Ranging (LiDAR) sensor is recorded, the recording medium storing a program to implement:
a function of forming a first inclination using Global Positioning System (GPS) altitude points of a vehicle driving region;
a function of detecting a driving lane using LiDAR points of a vehicle and determining a second inclination using the detected driving lane;
a function of rotating the GPS altitude points using the first inclination and the second inclination;
a function of obtaining a third inclination using a target point and a neighboring point, among the LiDAR points, the neighboring point belonging to a previous layer adjacent to a current layer to which the target point belongs;
a function of obtaining a fourth inclination using points that match the LiDAR points, among the rotated GPS altitude points; and
a function of determining the target point to be a ground point when an absolute value of a difference between the third inclination and the fourth inclination is less than a threshold inclination.

* * * * *